United States Patent
Kudo et al.

(10) Patent No.: US 9,124,307 B2
(45) Date of Patent: Sep. 1, 2015

(54) WIRELESS POWER TRANSMISSION SYSTEM WITH FOREIGN-SUBSTANCE DETECTION

(75) Inventors: Hiroki Kudo, Kanagawa-ken (JP); Noriaki Oodachi, Kanagawa-ken (JP); Kenichirou Ogawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 788 days.

(21) Appl. No.: 13/045,701

(22) Filed: Mar. 11, 2011

(65) Prior Publication Data
US 2012/0001493 A1    Jan. 5, 2012

(30) Foreign Application Priority Data
Jun. 30, 2010 (JP) .................. 2010-150433

(51) Int. Cl.
| H04B 5/00 | (2006.01) |
| H02J 5/00 | (2006.01) |
| G01V 3/10 | (2006.01) |

(52) U.S. Cl.
CPC .............. *H04B 5/0037* (2013.01); *H02J 5/005* (2013.01); *H04B 5/00* (2013.01); *H04B 5/0075* (2013.01); *G01V 3/101* (2013.01)

(58) Field of Classification Search
CPC ........................................... H04B 5/00
USPC ........................................ 307/104
See application file for complete search history.

(56) References Cited

U.S. PATENT DOCUMENTS

| 7,605,496 B2* | 10/2009 | Stevens et al. ............... 307/17 |
| 7,804,197 B2* | 9/2010 | Iisaka et al. ............... 307/104 |
| 7,847,438 B2* | 12/2010 | Jin et al. ............... 307/104 |
| 8,026,694 B2* | 9/2011 | Kamijo et al. ............... 320/108 |
| 8,064,825 B2* | 11/2011 | Onishi et al. ............... 455/41.1 |
| 8,198,754 B2* | 6/2012 | Iisaka et al. ............... 307/104 |
| 8,344,688 B2* | 1/2013 | Yoda et al. ............... 320/107 |
| 2008/0200119 A1* | 8/2008 | Onishi et al. ............... 455/41.1 |
| 2009/0021219 A1* | 1/2009 | Yoda et al. ............... 320/137 |
| 2010/0045114 A1* | 2/2010 | Sample et al. ............... 307/104 |

FOREIGN PATENT DOCUMENTS

| JP | 2000-134830 | 5/2000 |
| JP | 2006-230129 | 8/2006 |

* cited by examiner

*Primary Examiner* — Adi Amrany
(74) *Attorney, Agent, or Firm* — Amin, Turocy & Watson, LLP

(57) ABSTRACT

A power transmission system includes a power transmission apparatus, a power receiving apparatus, and a foreign-substance detecting unit. The power transmission apparatus has a power transmission coil to wirelessly transmit electric power. The power receiving apparatus has a power receiving coil to wirelessly receive electric power from the power transmission apparatus. The foreign-substance detecting unit detects a foreign substance which is present between the power transmission coil and the power receiving coil. In addition, the power transmission apparatus includes a voltage supply, a power supply controller, the power transmission coil, and a first measurement unit. The power receiving apparatus includes the power receiving coil and a second measurement unit.

19 Claims, 21 Drawing Sheets

WIRELESS POWER TRANSMISSION SYSTEM WITH FOREIGN-SUBSTANCE DETECTION

CROSS REFERENCE TO RELATED APPLICATION

This application is based upon and claims the benefit of priority from the prior Japanese Patent Application No. 2010-150433, filed on Jun. 30, 2010, the entire contents of which are incorporated herein by reference.

FIELD

Embodiments relate to a wireless power transmission system and apparatus for detecting a foreign-substance.

BACKGROUND

A wireless power transmission technology is employed for various devices or apparatuses for the sake of its convenience to wirelessly transmit electric power using a power transmission coil and a power receiving coil. In such a wireless power transmission technology, there has been a problem that electric power is accidentally fed to metals in the vicinity of the coils. There is known a technique to detect a foreign substance in order to solve the problem. The technique is employed for power transmission equipment having metals in the vicinity thereof and is based on a phenomenon that moving a metal closer to a resonance circuit used in the equipment changes a resonance frequency of the circuit.

BRIEF DESCRIPTION OF DRAWINGS

Aspects of this disclosure will become apparent upon reading the following detailed description and upon reference to accompanying drawings. The description and the associated drawings are provided to illustrate embodiments of the invention and not limited to the scope of the invention.

DESCRIPTION

Embodiments will be described below.

First Embodiment

Figure 1:
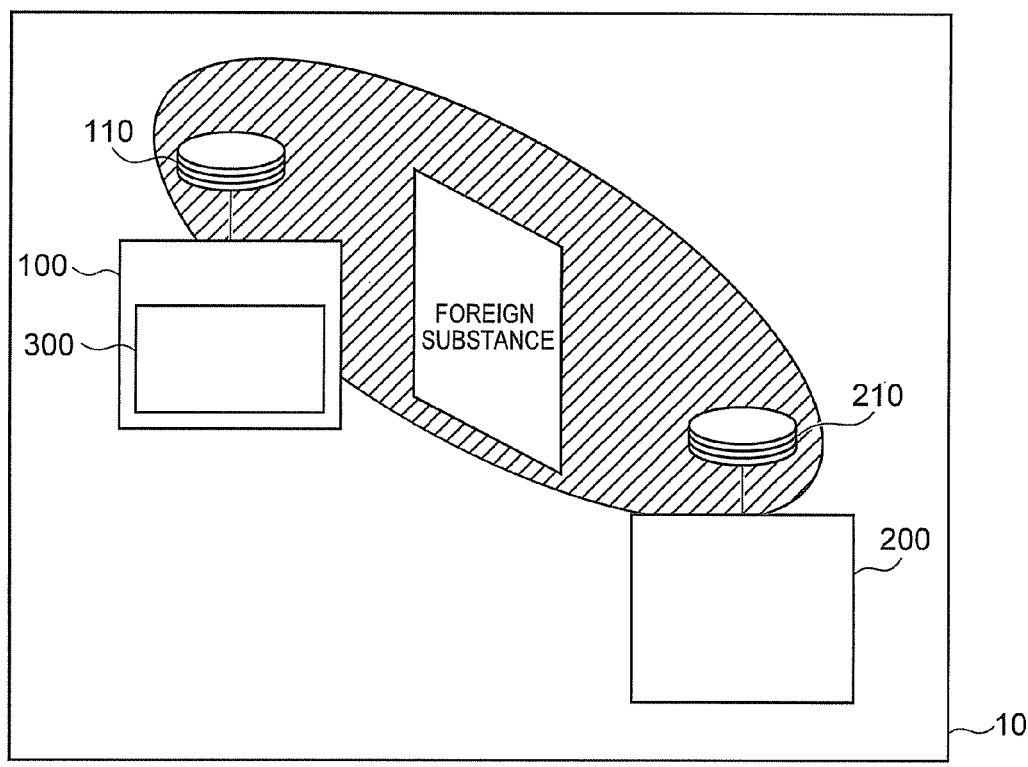
FIG. 1 is a view showing a power transmission system according to a first embodiment.

FIG. 1 is a view showing an power transmission system 10 according to a first embodiment. The power transmission system 10 is provided with a power transmission apparatus 100 and a power receiving apparatus 200. The power transmission apparatus 100 performs wireless (noncontact) power transmission to the power receiving apparatus 200, i.e., wirelessly using a power transmission coil 110. The power receiving apparatus 200 receives electric power from the power transmission apparatus 100 wirelessly through a power receiving coil 210. The frequency used for the power transmission can be chosen from a wide range of 10 kHz to tens of MHz, but is not limited to the range.

The power transmission apparatus 100 is provided with at least one power transmission coil 110 and a foreign-substance detecting unit 300 to judge whether or not a foreign substance is present. The power receiving apparatus 200 is provided with at least one power receiving coil 210. A foreign substance can be present between the power transmission coil 110 and the power receiving coil 210. The foreign substance means a material which can deteriorate a power transmission efficiency between the power transmission coil 110 and the power receiving coil 210, and may include a metallic magnetic material. The foreign-substance detecting unit 300 is provided to the power transmission apparatus 100 as shown in FIG. 1 and may be provided to a discrete apparatus which differs from the power transmission apparatus 100 or the power receiving apparatus 200.

The power transmission coil 110 and the power receiving coil 210 resonate at the respective resonance frequencies. The power transmission coil 110 and the power receiving coil 210 may be self-resonance coils, or may resonate with a resonance circuit to be connected. The power transmission efficiency is more enhanced when the resonance frequencies of the power transmission coil 110 and the power receiving coil 210 are equal to each other. However, both the frequencies may be different from each other.

Figure 2:
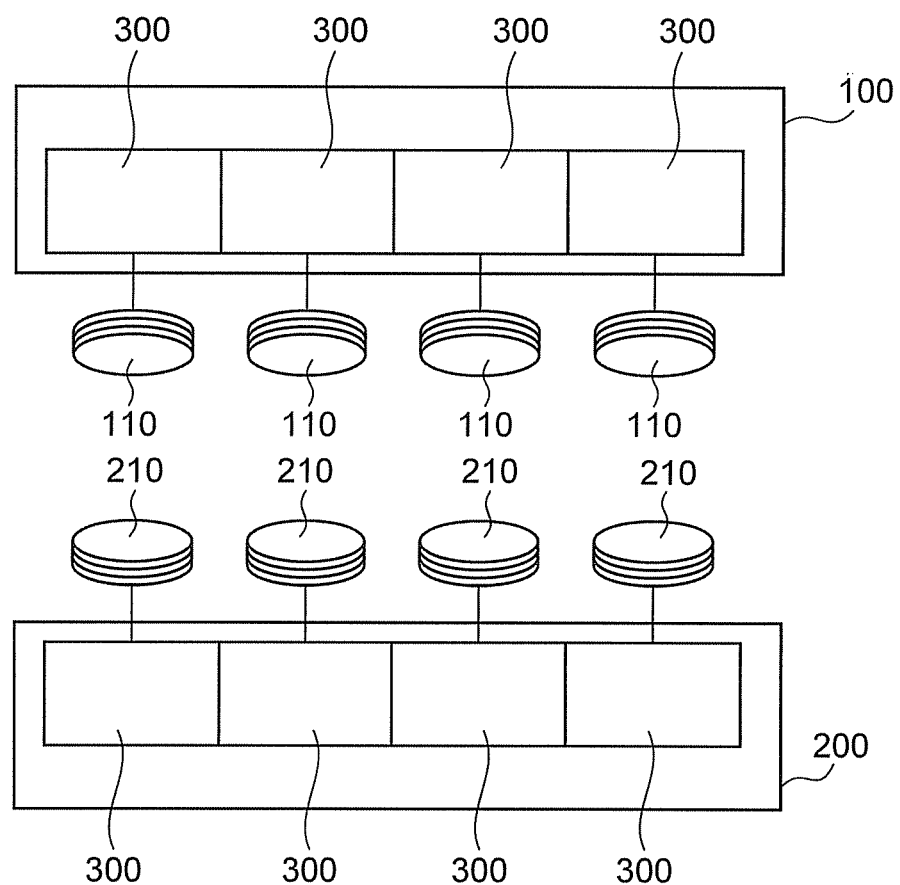
FIG. 2 is a view showing configurations of a power transmission apparatus and a power receiving apparatus.

FIG. 2 is a view showing configurations of the power transmission and power receiving apparatuses 100 and 200. As shown in FIG. 2, the power transmission apparatus 100 may be provided with two or more power transmission coils 110, i.e., n coils (n: an integer of 2 or more) and two or more foreign-substance detecting units 300. The power receiving apparatus 200 may be provided with two or more power receiving coils 210, i.e., m coils (m: an integer of 2 or more) and two or more foreign-substance detecting units 300. Each foreign-substance detecting unit 300 detects whether or not a foreign substance is present between the power transmission coil 110 and the power receiving coil 210 in one round detection. Alternatively, when the power transmission system 10 is provided with n power transmission coils 110 and m power receiving coils 210, one of the foreign-substance detecting units 300 may detect a foreign substance through n×m detection processes, or two or more foreign-substance detecting units 300 may detect the foreign substance simultaneously.

Figure 3:
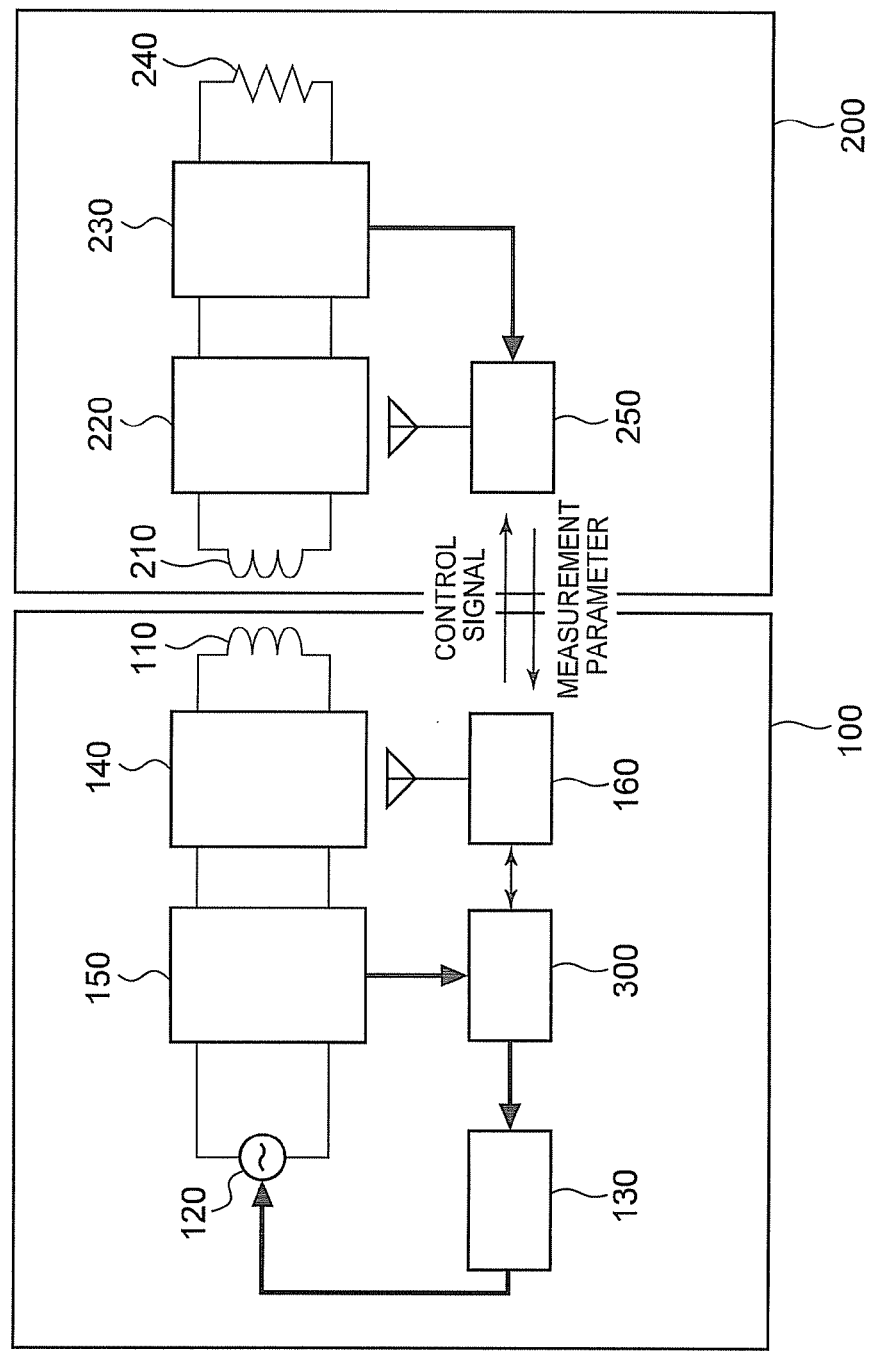
FIG. 3 is a view showing a configuration of the power transmission system in detail.

FIG. 3 is a view showing a configuration example of the power transmission system 10 in detail. The power transmission apparatus 100 is provided with the power transmission coil 110, a voltage supply 120, a power supply controller 130, a first resonance circuit 140, a first measurement unit 150, a first communicator 160, and the foreign-substance detecting unit 300.

The voltage supply 120 outputs a first AC signal with a variable frequency. The power supply controller 130 varies the frequency of the first AC signal, which is outputted by the voltage supply 120, in a certain frequency range from a first frequency up to a second frequency.

The first resonance circuit 140 and the power transmission coil 110 are integrated with each other to resonate at the first resonance frequency. Whatever resonates as a unit along with the power transmission coil 110 may be employed for the first resonance circuit 140. Examples to be employed for the first resonance circuit 140 may be "L (inductor)" and "C (capacitor)" which are connected to each other in series in a line joining the power supply 120 and the power transmission coil 110. The power transmission coil 110 receives the first AC signal to generate a magnetic field. A Q-value shows a magnitude of resonance between the first resonance circuit 140 and the power transmission coil 110. The high Q-value could enable a high power transmission efficiency even if the distance between the power transmission coil 110 and the power receiving coil 210 were long. A resonance circuit having a high Q value is difficult to design, thereby determining the Q value depending on usage environments for applications.

The first measurement unit 150 measures a first reflectance in a frequency range from the first frequency to the second frequency two or more times. The first reflectance is defined as at least one of a voltage reflectance of the first AC signal, a current reflectance of the first AC signal, and a power reflectance of the first AC signal between the power supply 120 and the power transmission coil 110. The first measurement unit 150 measures frequency dependence of the first reflectance. The first measurement unit 150 may calculate a reflectance by dividing the power reflected from the power transmission coil 110 (reflected power) by the power outputted from the voltage supply 120 (input power), for example. The first measurement unit 150 may separate the input power from the reflective power by a directional coupler.

The first communication unit 160 transmits control signals from the power transmission apparatus 100 to the power receiving apparatus 200 (second communication unit), the control signals including a signal to inform the start of power transmission, a signal to inform the start of the foreign substance detection, and a signal to demand parameters measured in the power receiving apparatus 200. The first communication unit 160 receives a control signal to demand power transmission, a parameter measured in the power receiving apparatus 200, etc. from the second communication unit.

The power receiving apparatus 200 is provided with a power receiving coil 210, a second resonance circuit 220, a second measurement unit 230, a load 240, and the second communication unit 250.

The power receiving coil 210 generates a second AC signal by receiving the magnetic field which is generated by the power transmission coil 110. The power receiving coil 210 and the second resonance circuit 220 are integrated with each other to resonate at the second resonance frequency. Whatever resonates as a unit along with the power receiving coil 210 may be employed for the second resonance circuit 220. Examples to be employed for the second resonance circuit 220 may be "L" and "C" which are connected to each other in series in a line joining the power receiving coil 210 and the load 240. The higher the Q-value is, the higher the power transmission efficiency is. The Q-value shows a magnitude of resonance between the power receiving coil 210 and the second resonance circuit 220. The Q-value showing the magnitude of resonance between the power receiving coil 210 and the second resonance circuit 220 is determined depending on usage environments for applications.

The second measurement unit 230 measures a second reflectance in a frequency range from the first frequency to the second frequency two or more times. The second reflectance is defined as at least one of a voltage reflectance of the second AC signal, a current reflectance of the second AC signal, and a power reflectance of the second AC signal between the power receiving coil 210 and the load 240. The second measurement unit 230 measures frequency dependence of the second reflectance. The second measurement unit 230 may calculate reflectance by dividing the power reflected from the load 240 (reflected power) by the power outputted from the power receiving coil 210 (input power), for example. The second measurement unit 230 may separate the input power from the reflective power by a directional coupler.

Examples of the load 240 include devices or apparatuses to receive power supply. Whatever wirelessly receives the power supply may be applied to the load 240. The examples thereof include a mobile phone and a notebook computer.

The second communication unit 250 transmits a control signal and a parameter. The control signal is to demand power transmission to the foreign-substance detecting unit 300 (first communication unit 160). The parameter (frequency dependence of second reflectance or second peaking frequency) is measured in the power receiving apparatus 200. The second communication unit 250 receives a control signal etc. from the power transmission apparatus 100 (first communication unit 160 included therein).

The foreign-substance detecting unit 300 (provided to the power transmission apparatus 100 in the example of FIG. 3) detects a foreign substance which is present between the power transmission coil 110 and the power receiving coil 210. The foreign-substance detecting unit 300 uses a frequency (first peaking frequency) and another frequency (second peaking frequency) to detect whether or not a foreign substance is present. The first reflectance reaches a local minimum at the first peaking frequency and the second reflectance reaches a local minimum at the second peaking frequency.

<Normal Operation>

The power transmission apparatus 100 makes the frequency of the first AC signal outputted by the voltage supply 120 coincide with the first resonance frequency of the power transmission coil 110 (the power transmission coil 110 and the first resonance circuit 140), thereby passing a large current through the power transmission coil 110 to transmit electric power to the power receiving apparatus 200. In case that neither foreign substance nor power receiving apparatus 200 is present, the frequency (first peaking frequency) at which the first reflectance reaches a local minimum coincides with the first resonance frequency. The power supply controller 130 adjusts the frequency of the AC signal outputted by the voltage supply 120 to the first peaking frequency during power transmission. In addition, when the frequency of the first AC signal and the first resonance frequency do not coincide with each other, a current does not pass through the power transmission coil 110 and most of the current is reflected as a result of impedance mismatching.

<Foreign Substance Detection Process>

How to detect a foreign substance using the foreign-substance detecting unit 300 will be described below.

Figure 4:
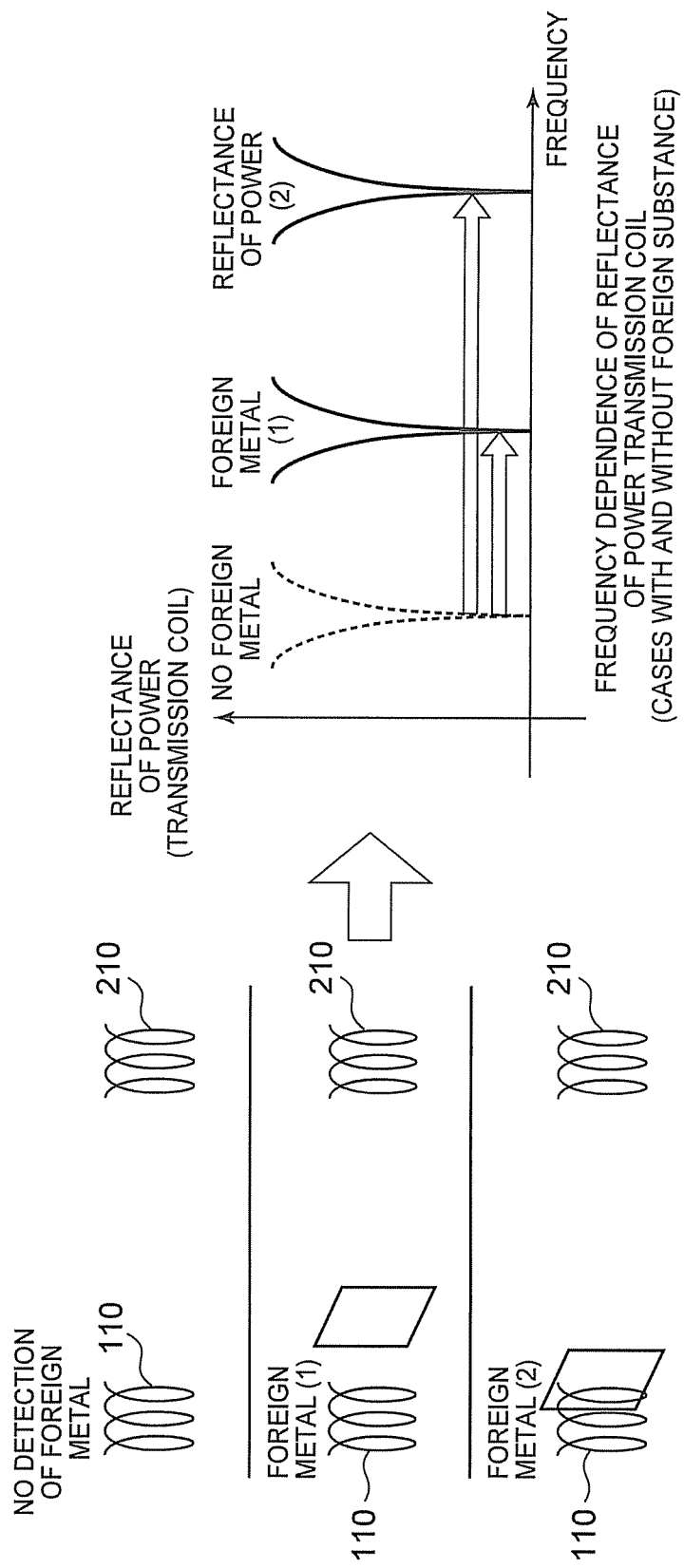
FIG. 4 is a schematic view showing frequency dependence of a first reflectance.

FIG. 4 is a schematic view showing frequency dependence of the first reflectance. The frequency dependence depends on whether or not a foreign substance is present between the power transmission coil 110 and the power receiving coil 210, and on the location of the foreign substance. The frequency dependence of the first reflectance and the first peaking frequencies are shown therein with respect to the first condition having no foreign substance, the second condition having a foreign substance (1), and the third condition having a foreign substance (2).

In case that a foreign substance is present between the power transmission coil 110 and the power receiving coil 210, the first peaking frequency shifts to a higher frequency as shown in FIG. 4. The more the foreign substance approaches the power transmission coil 110, the higher frequency the first peaking frequency shifts to. The shift amount of the first peaking frequency is in inverse proportion to the distance between the power transmission coil 110 and the foreign substance, while the shift amount thereof is in proportion to the size of the foreign substance.

The shift amount of the first peaking frequency is in inverse proportion to the distance between the power transmission coil 110 and the foreign substance, thereby allowing it to therefrom derive a delta between the first peaking frequencies under the conditions with and without a foreign substance. The delta allows the foreign-substance detecting unit 300 to detect whether or not a foreign substance is present. Moreover, the delta allows it to presume the severity of the foreign substance. When the size of the foreign substance is obvious, the location of the foreign substance can be pinpointed from the delta. In addition, the foreign-substance detecting unit 300 includes a storage unit therein (not shown) to normally memorize the first peaking frequency without a foreign substance.

The reason why the first peaking frequency shifts to a higher frequency as a result of a foreign substance near the power transmission coil 110 is that the foreign substance reduces the inductance of the power transmission coil 110. In a case such that a foreign substance is inserted to interrupt a radiation plane of magnetic flux generated in the power transmission coil 110, the magnetic flux interlinks the foreign substance. The interlinkage magnetic flux generates an eddy current so that the eddy current generates another magnetic flux in a direction to cancel the interlinkage magnetic flux. The eddy current reduces the interlinkage magnetic flux of the power transmission coil 110, thereby reducing the inductance thereof. Here, resonance frequencies of the power transmission coil 110 and the first resonance circuit 140 (or self-resonance coil) are expressed with the following formula.

$$f_0 = \frac{1}{2\pi\sqrt{LC}}$$ [formula 1]

In the formula 1, the inductance L of the power transmission coil 110 decreases to make $f_0$ higher. Therefore, the foreign substance approaches the power transmission coil 110 to make the peaking frequency of the reflectance of the power transmission coil 110 shift to a higher frequency. The more the eddy current passes through the foreign substance, the higher the effect is to cancel the magnetic flux generated by the power transmission coil 110, and the more greatly the inductance of the power transmission coil 110 is reduced. The shorter the distance between the foreign substance and the power transmission coil 110, the larger the reduction amount of the inductance thereof, and the higher the peaking frequency. The delta between the first peaking frequencies of the cases with and without the foreign substance allows it to presume the severity of the foreign substance during the wireless power transmission and to judge as follows. The larger the delta is, the more easily the foreign substance is heated, and the lower the efficiency of power transmission is. In addition, a phenomenon that the peaking frequency shifts occurs not only in the power transmission coil 110 but also the power receiving coil 210. The foreign substance is detected near the power receiving coil 210 using the shift amount of the second peaking frequency of the second reflectance in the power receiving apparatus 200 to specify the severity of the foreign substance.

The power transmission apparatus 100 and the power receiving apparatus 200 are provided with the first and second measurement units 150, 230, respectively. This allows it to measure the peaking frequencies of reflectances of the power transmission coil 110 and the power receiving coil 210. Therefore, the foreign-substance detecting unit 300 can detect a wide variety of foreign substances and can specify the severity thereof on the basis of the shift amounts of the first and second peaking frequencies.

Figure 5:
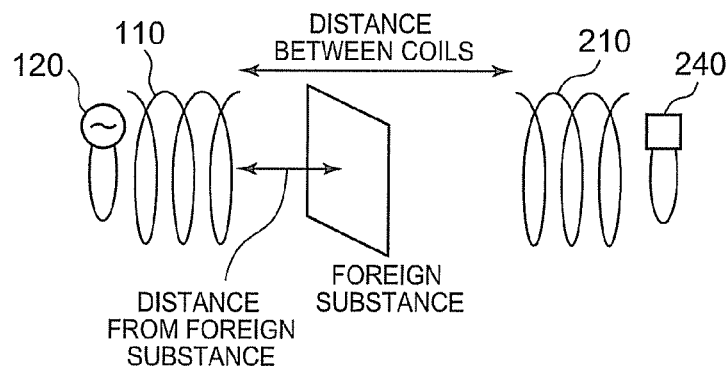
FIG. 5 is a view showing a condition for an electromagnetic simulation.

FIG. 5 is a view showing a condition for an electromagnetic simulation. The shift amounts of the first and second peaking frequencies will be described below on the basis of the electromagnetic simulation. In the example shown in FIG. 5, the power transmission side is provided with a voltage supply 120, a power transmission coil 110, and a first loop whose central axis is the same as that of the power transmission coil 110. The voltage supply 120 is connected to the first loop. The power receiving side is provided with a load 240, a power receiving coil 210, and a second loop whose central axis is the same as that of the power receiving coil 210. The load 240 is connected to the second loop. The distance between the power transmission coil 110 and the power receiving coil 210 is 60 cm. The foreign substance is a metal plate locating perpendicularly to the central axis and apart from the power transmission coil 110 by x·cm (x is a real number more than 0 and less than 60). The first loop and a space between the first loop and the power transmission coil 110 are equivalent to a first resonance circuit 140. The second loop and a space between the second loop and the power receiving coil 210 are equivalent to a second resonance circuit 220.

Figure 6A:
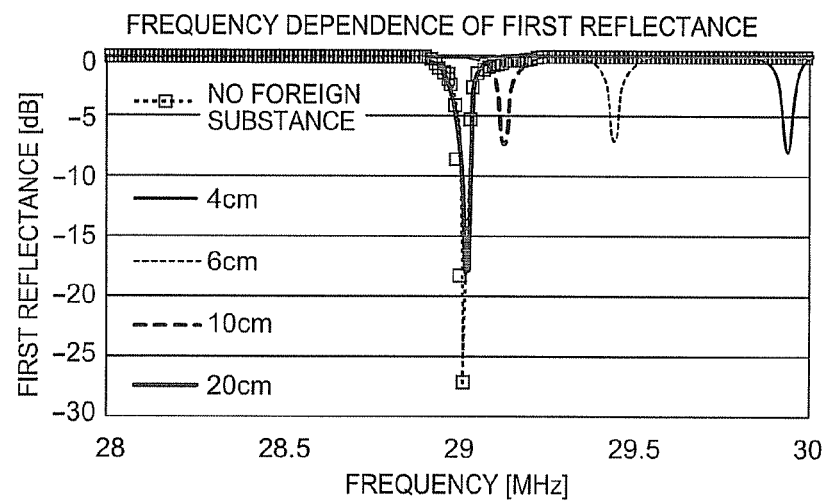
FIGS. 6A and 6B are views showing frequency dependence of a first reflectance and frequency dependence of a second reflectance, respectively.
Figure 6B:
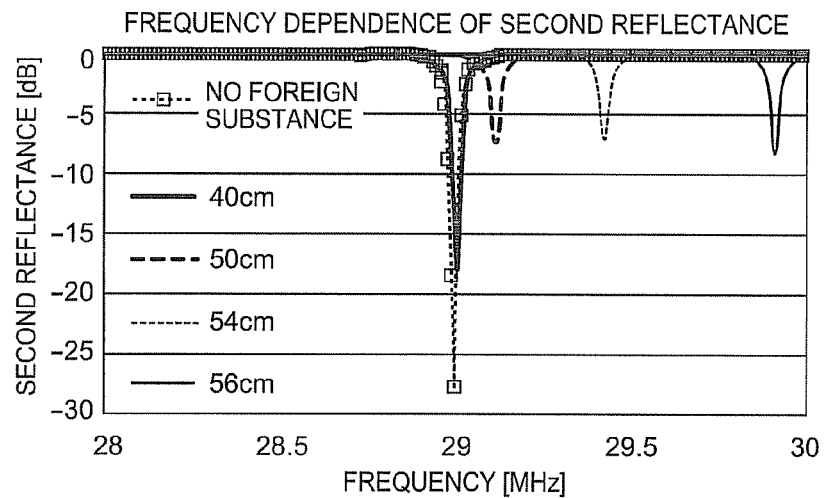

FIGS. 6A and 6B are views showing frequency dependence of the first reflectance of the power transmission side (the power transmission coil 110) and frequency dependence of the second reflectance of the power receiving side (the power receiving coil 210), respectively. FIG. 6A shows five cases. A case having no foreign substance is represented with a thin dotted line and white squares. Another four cases having the foreign substances (metal plates) 4 cm, 6 cm, 10 cm, and 20 cm apart from the power transmission coil 110 are represented with a thin solid line, a thin dotted-line, a bold dotted-line, and a bold solid line, respectively. FIG. 6B shows five cases. A case having no foreign substance is represented with a thin dotted line and white squares. Another four cases having the foreign substances (metal plates) 4 cm (=60−x), 6 cm, 10 cm, and 20 cm apart from the power receiving coil 210 are represented by a thin solid line, a thin dotted-line, a bold dotted-line, and a bold solid line, respectively.

The more the foreign substance approaches the power transmission coil 110, the higher the first peaking frequency of the first reflectance to be measured in the power transmission apparatus 100 becomes. The more the foreign substance approaches the power receiving coil 210, the higher the second peaking frequency of the second reflectance to be measured in the power receiving apparatus 200 becomes.

Figure 7:
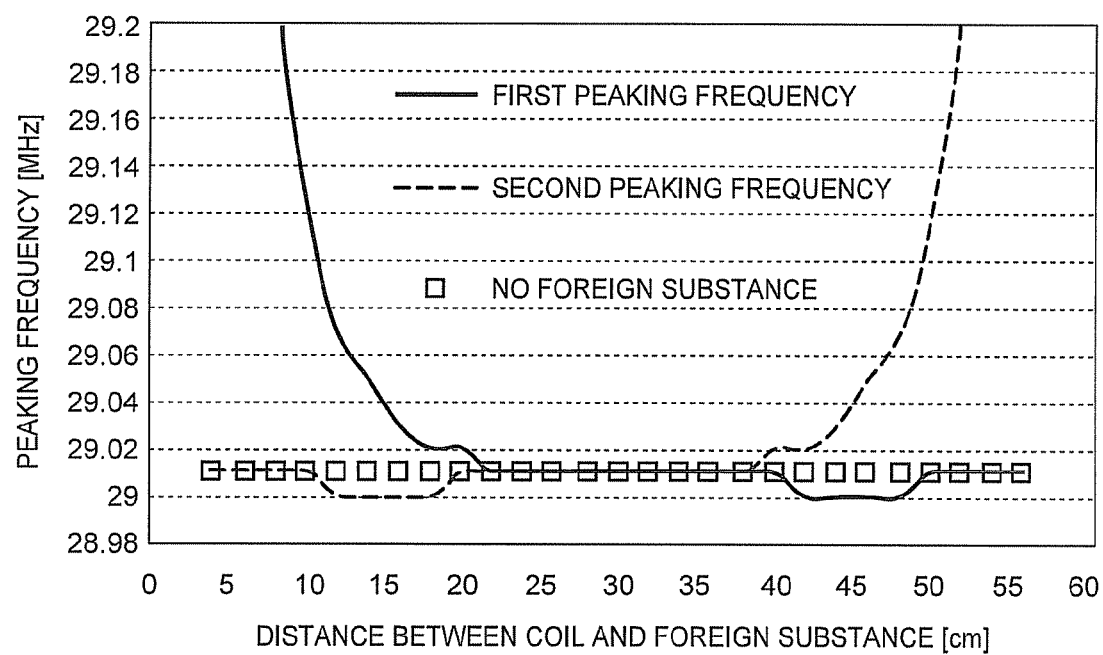
FIG. 7 is a graph showing dependence of first and second peaking frequencies on a distance (xcm) between a foreign substance and a power transmission coil.

FIG. 7 is a graph showing dependence of the first and second peaking frequencies on the distance (xcm) between the foreign substance and the power transmission coil 110. The vertical and horizontal axes represent the peaking frequencies and the distance, respectively. The first and second peaking frequencies for a case having a foreign substance are represented by a solid line and a dotted-line, respectively. The first peaking frequency for a case having no foreign substance is represented by white squares.

The first measurement unit 150 and the second measurement unit 230 can measure a change in the peak frequencies by a frequency difference of about 0.01 MHz. The foreign-substance detecting unit 300 can detect a foreign substance on the basis of shift amounts of the first and second peak frequencies when the foreign substance is 0 to 20 cm apart from the power transmission coil 110 or the power receiving coil 210. The foreign-substance detecting unit 300 can identify the presence of the foreign substance when the shift amount of the first or second peak frequency is not less than a threshold value, e.g., 0.01 MHz. The foreign-substance detecting unit 300 can determine the severity of the foreign substance during the power transmission from the shift amount of the first or second peak frequency.

In the example shown in FIG. 5, the foreign-substance detecting unit 300 cannot detect a foreign substance only on the basis of the shift amounts of the first and second peak frequencies when the foreign substance is more than 20 cm apart from both the power transmission coil 110 and the power receiving coil 210, i.e., the foreign substance is in the middle therebetween.

However, the foreign-substance detecting unit 300 can detect the foreign substance inserted in the middle between the power transmission coil 110 and the power receiving coil 210 on the basis of the change amount of the first or second reflectance. The foreign-substance detecting unit 300 allows it to judge that a foreign substance has been inserted in the middle between the power transmission coil 110 and the power receiving coil 210 when the first or second reflectance has changed over the threshold value within a specific period of time.

A frequency used during power transmission is a frequency at which reflectance reaches a local minimum in the power transmission apparatus 100 and the power receiving apparatus 200, or a frequency at which the power transmission efficiency reaches a local maximum. If a foreign substance is inserted near the power transmission coil 110 or near the power receiving coil 210 during power transmission, the foreign substance shifts the first or second peaking frequency to increase or decrease the first or second reflectance. When the first or second reflectance has exceeded the threshold value within a specific period of time, the foreign-substance detecting unit 300 allows it to judge instantaneously that a foreign substance has been inserted, thereby providing an instantaneous detection of the foreign substance to be inserted. A threshold value may be just determined on the basis of the reflectance at the local minimum point of the reflectance. For example, the threshold value may be a half value (+3 dB) of the minimum value of reflectance.

Second Embodiment

Figure 8:
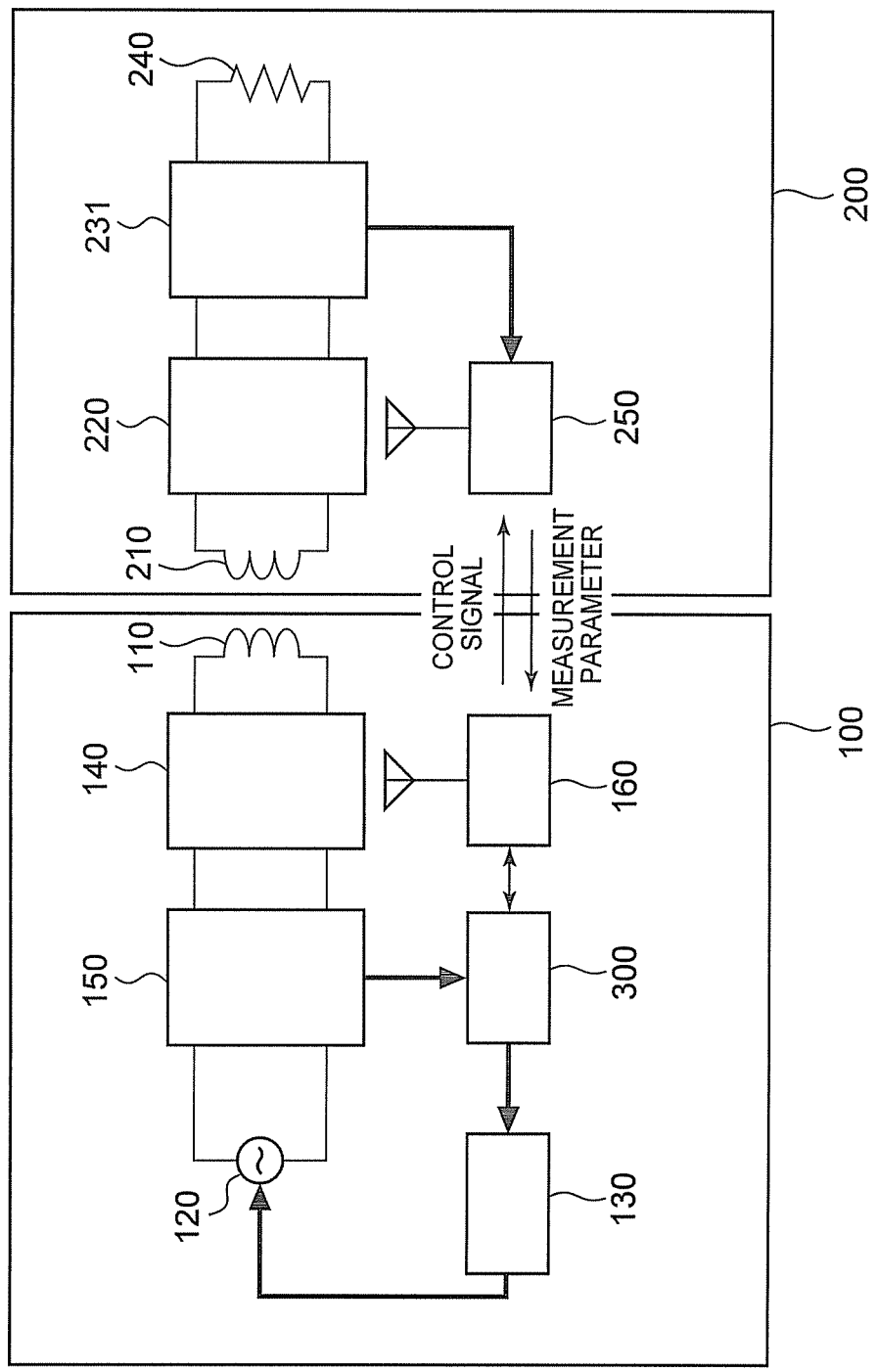
FIG. 8 is a view showing a power transmission system according to a second embodiment.

FIG. 8 is a view showing a power transmission system 11 according to a second embodiment.

The second embodiment is different from the first embodiment in that the second embodiment is provided with a third measurement unit 231 to measure a power consumed by the load 240 instead of the second measurement unit 230 to measure the reflectance of the second AC signal generated by the power receiving coil 210. Descriptions about the same configurations and their operations as those in the first embodiment will be denoted with the same numerals and names to be omitted below. The same configurations include the voltage supply 120, the power supply controller 130, the first measurement unit 150, the first resonance circuit 140, the power transmission coil 110, the first communication unit 160, the power receiving coil 210, the load 240, and the second communication unit 250.

The third measurement unit 231 more than once measures electric power (second electric power: electric power to be supplied to the load 240) whose consumption is caused by passing the second AC signal through the load 240 in a certain frequency range (from the first frequency to the second frequency). The third measurement unit 231 measures the frequency dependence of the second electric power.

The foreign-substance detecting unit 300 (to be provided to the power transmission apparatus 101 in the example of FIG. 8) detects a foreign substance present between the power transmission coil 110 and the power receiving coil 210. The foreign-substance detecting unit 300 detects whether or not a foreign substance is present on the basis of the first peaking frequency at which the first reflectance reaches a local minimum and the third frequency at which the power transmission efficiency reaches a local maximum. Then, the foreign-substance detecting unit 300 also specifies the severity of the foreign substance. The power transmission efficiency is derived from the electric power supplied to the load 240 (second electric power) divided by the electric power transmitted by the power transmission coil (first electric power).

Figure 9:
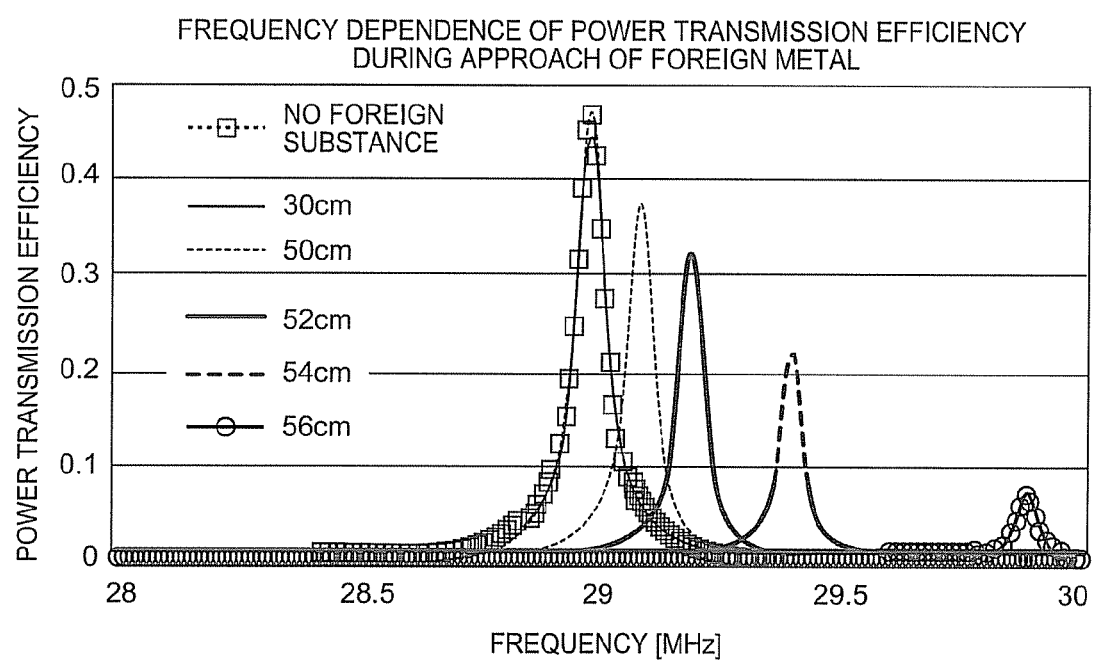
FIG. 9 is a view showing frequency dependence of power transmission efficiencies.

FIG. 9 is a view showing frequency dependence of the power transmission efficiencies. The frequency dependence of the power transmission efficiencies was obtained from an electromagnetic simulation on the basis of the assumption as shown in FIG. 5. FIG. 9 shows six cases. A case having no foreign substance is represented by a thin dotted line with white squares. A case having a foreign substance (metal plate) 30 cm (=x) apart from the power transmission coil 110 is represented by a thin solid line. Another 4 cases having the foreign substance 10 cm (=60−x), 8 cm, 6 cm, and 4 cm apart from the power receiving coil 210 are represented by a thin dotted-line, a bold solid line, a bold dotted-line, and a bold solid line with white circles, respectively. The third peaking frequency shifts to a higher frequency as well as the second peaking frequency of the second reflectance shown in FIG. 6B.

Figure 10:
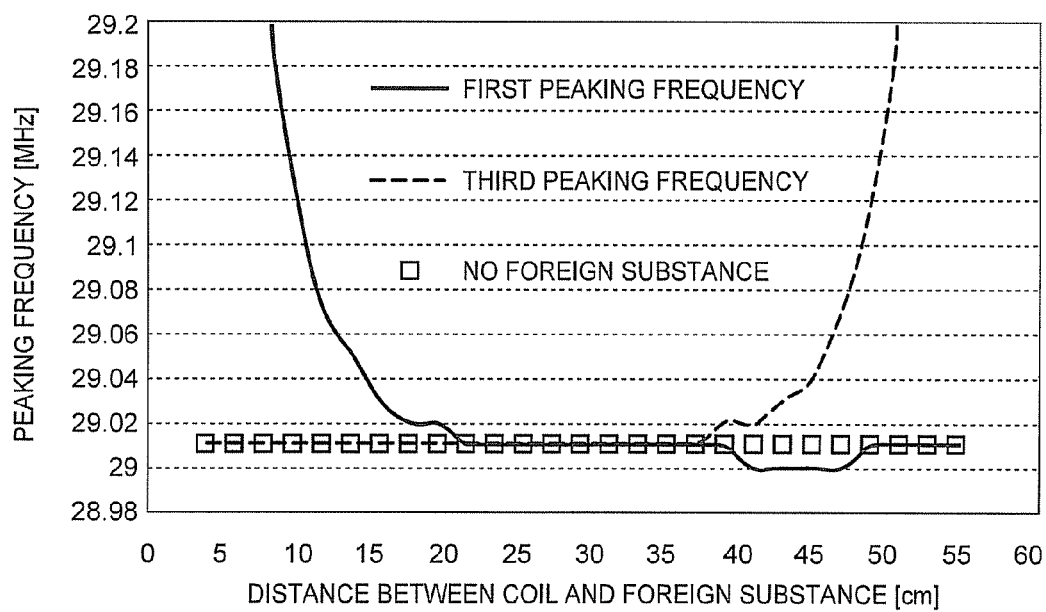
FIG. 10 is a graph showing dependence of the first and third peaking frequencies on the distance (xcm) between the foreign substance and the power transmission coil.

FIG. 10 is a view showing dependence of the first and third peaking frequency on a distance (xcm) between the foreign substance and the power transmission coil 110. The vertical axis represents the first and third peaking frequencies. The horizontal axis represents the distance (xcm) therebetween. FIG. 10 shows three cases. When the foreign substance is present, the first and third peaking frequencies are represented by a solid line and a dotted-line, respectively. When no foreign substance is present, the first peaking is represented by white squares.

The foreign-substance detecting unit 300 in the second embodiment can detect a foreign substance on the basis of the shift amounts of the first and third peaking frequencies as well as in the first embodiment when the foreign substance is 0 to 20 cm apart from the power transmission coil 110 and when the foreign substance is 0 to 20 cm apart from the power receiving coil 210. The foreign-substance detecting unit 300 can judge the presence of the foreign substance when the shift amounts of the first and third peaking frequencies are not less than a threshold value, e.g., 0.01 MHz. The foreign-substance detecting unit 300 can specify the severity of the foreign substance from the shift amount of the first or third peak frequency during power transmission.

The power transmission efficiency is expressed here with the following formula.

$$\eta_{eff} = \frac{P_r}{P_t} = \frac{P_r}{P_{in} - P_{return}} \quad \text{[formula 2]}$$

$P_r$ is a second electric power to be supplied to the load 240 of the power receiving apparatus 200; $P_t$ is a first electric power to be outputted from the power transmission coil 110; $P_{in}$ is electric power to be outputted from the voltage supply 120; and $P_{return}$ is reflected electric power from the power transmission coil 110.

Modification 1 of First and Second Embodiments

Figure 11:
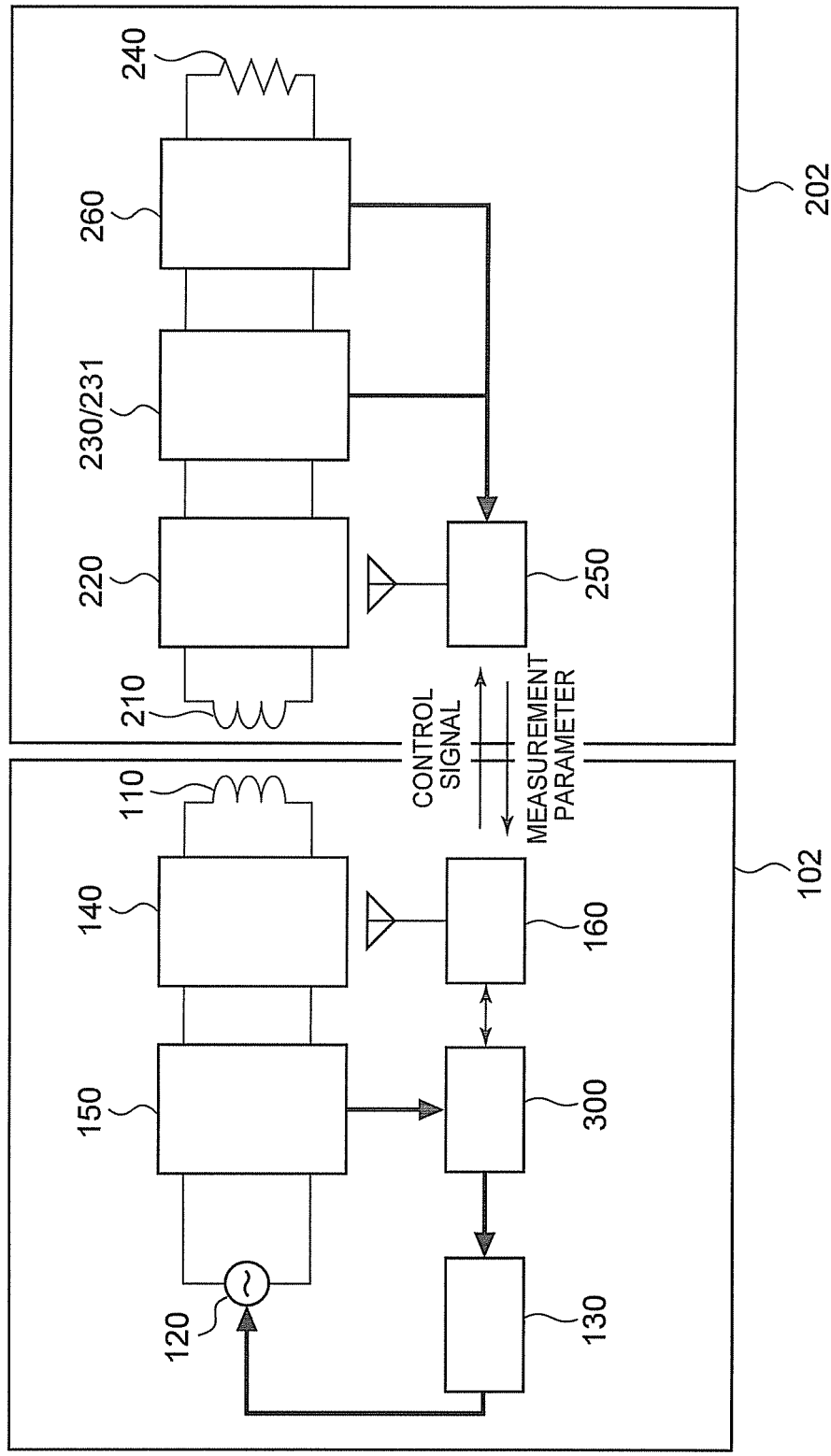
FIG. 11 is a view showing a power transmission system according to a modification 1 of the first and second embodiments.

FIG. 11 is a view showing a power transmission system 12 according to a modification 1 of the first and second embodiments. The power transmission system 12 according to the modification 1 further includes a load controller 260 in comparison with the first and second embodiments. The load controller 260 can control or measure the resistance value of the load 240.

Figure 12:
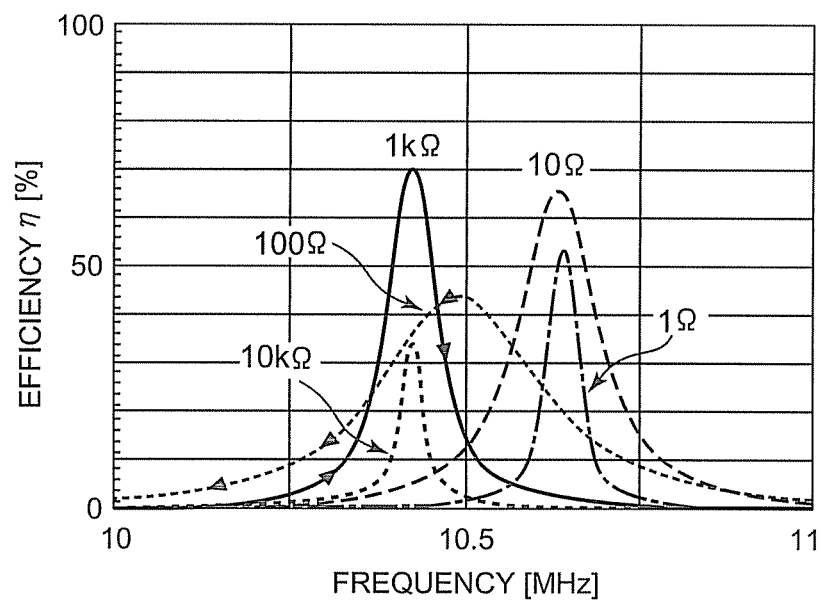
FIG. 12 is a view showing a relation between a frequency property η of a power transmission efficiency and a resistance value of a load.

FIG. 12 is a view showing a relation between a frequency property η of the power transmission efficiency and the resistance value of the load 240. The frequency dependence of the power transmission efficiency changes in accordance with the respective resistance values of the load 240, i.e., 1Ω, 10Ω, 100Ω, 1 kΩ, and 10 kΩ. The third peaking frequency shifts also in accordance therewith. Moreover, the frequency dependence of the first and second reflectances changes with a change in the resistance of the load 240. The first and second peaking frequencies also change therewith. Therefore, there is a case that the resistance of the load 240 when measuring the first to third peaking frequencies without a foreign substance is different from that when measuring the first to third peaking frequencies with a foreign substance. In such a case, the foreign-substance detecting unit 300 cannot separate the shift of the first to third peaking frequencies due to a foreign substance between the power transmission coil 110 and the power receiving coil 210 from the shift thereof due to a change in the resistance of the load 240. The load controller 260 regulates the resistance of the load 240 so that the resistance of the load 240 becomes constant when measuring the first to third peaking frequencies without a foreign substance and when measuring the first to third peaking frequencies with a foreign substance.

In this way, the foreign-substance detecting unit 300 can detect a foreign substance and evaluate the severity of the foreign substance precisely on the basis of the sift amounts of the first to third peaking frequencies.

The load controller 260 makes both terminals of the load 240 short-circuit, i.e., zeros the resistance of the load 240, thereby sharpening the peak of the second reflectance to allow it to measure the second peaking frequency with high accuracy. On the other hand, the load controller 260 adjusts the resistance of the load 240 to a prescribed value, thereby rounding off the peak of the second reflectance to allow it to detect a peak even for a low frequency resolution of the frequency-variable voltage supply 120 and to reduce a processing load.

In the second embodiment, the foreign-substance detecting unit 300 can detect a foreign substance using the first peaking frequency, the third peaking frequency, and a piece of information on the resistance of the load 240 measured by the load controller 260.

The foreign-substance detecting unit 300 memorizes how the power transmission efficiency varies in response to a variation in the resistance of the load 240, thereby discriminating the variation in the power transmission efficiency due to the variation in the resistance of the load 240 from that due to a foreign substance present between the power transmission coil 110 and the power receiving coil 210.

If the foreign-substance detecting unit 300 judges that a change (degradation) in the power transmission efficiency during power transmission is not due to a change in the resistance of the load 240, the foreign-substance detecting unit 300 judges that a foreign substance has been inserted, thereby allowing it to detect a foreign substance precisely. The foreign-substance detecting unit 300 can detect also a foreign substance located in the middle between the power transmission coil 110 and the power receiving coil 210.

When a spatial relation between the power transmission apparatus 100 and the power receiving apparatus 200 is varied, the foreign-substance detecting unit 300 uses a piece of information of a coupling constant between the power transmission coil 110 and the power receiving coil 210 to detect a foreign substance precisely. In addition, a theoretical efficiency of power transmission is calculated from the coupling coefficient between the power transmission coil 110 and the power receiving coil 210.

When a foreign substance is detected before power transmission, the foreign-substance detecting unit 300 uses a piece of information of a position relation and a piece of information of a coupling constant to compare the theoretical efficiency of power transmission with an actually measured power transmission efficiency, thereby detecting the presence of the foreign substance before starting the power transmission. The position relation is dynamically measured between the power transmission apparatus 100 and the power receiving apparatus 200. The coupling constant is dynamically measured between the power transmission coil 110 and the power receiving coil 210. The theoretical efficiency thereof is derived from the Q-values of the power transmission and receiving coils 110, 210 and the position relation therebetween.

Modification 2 of First and Second Embodiments

A power transmission system 13 according to a modification 2 of the first and second embodiments is different from the first and second embodiments in that the foreign-substance detecting unit 300 further uses the number of local minimum points of the frequency dependence of the first reflectance (the first peaking frequency) or the number of local minimum points of the frequency dependence of the second reflectance (the second peaking frequency) to detect a foreign substance.

Figure 13:
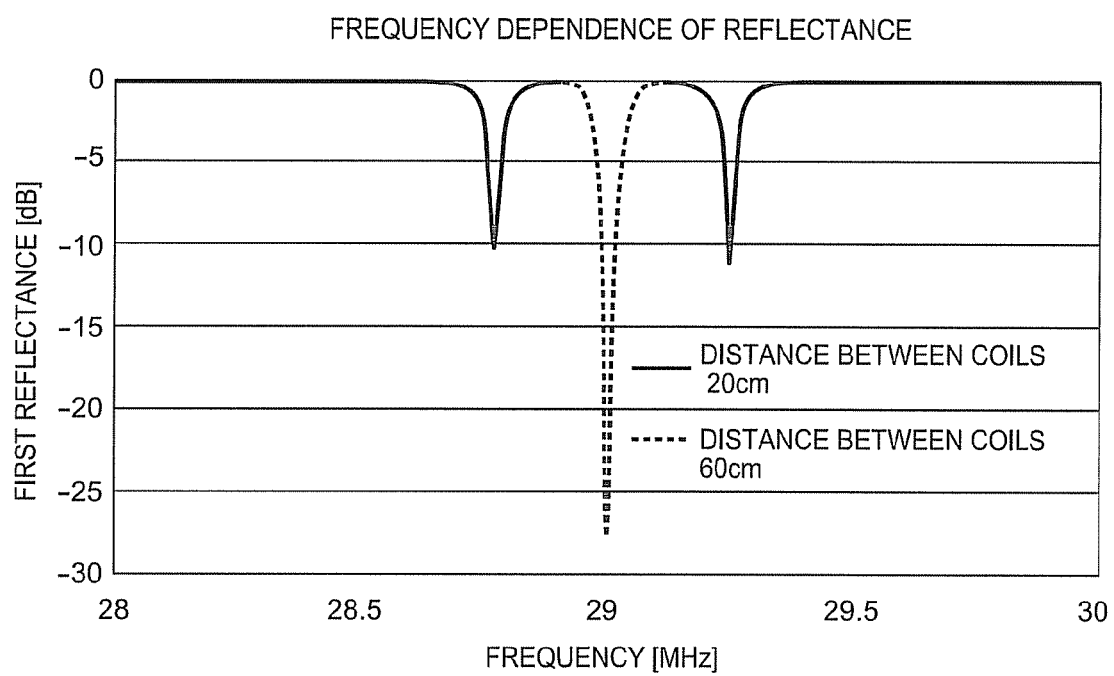
FIG. 13 is a view showing simulations on frequency dependence of the first reflectance.

FIG. 13 is a view showing simulations on frequency dependence of the first reflectance when the distance between the power transmission coil 110 and the power receiving coil 210 is set to 20 cm and 60 cm. The simulations having the distances of 20 cm and 60 cm between the power transmission coil 110 and the power receiving coil 210 are represented with a solid line and a dotted-line, respectively. When the distance therebetween is 20 cm, the frequency dependence of the first reflectance has two peaks (first peaking frequency). This is the same as the frequency dependence of the second reflectance.

Figure 14A:
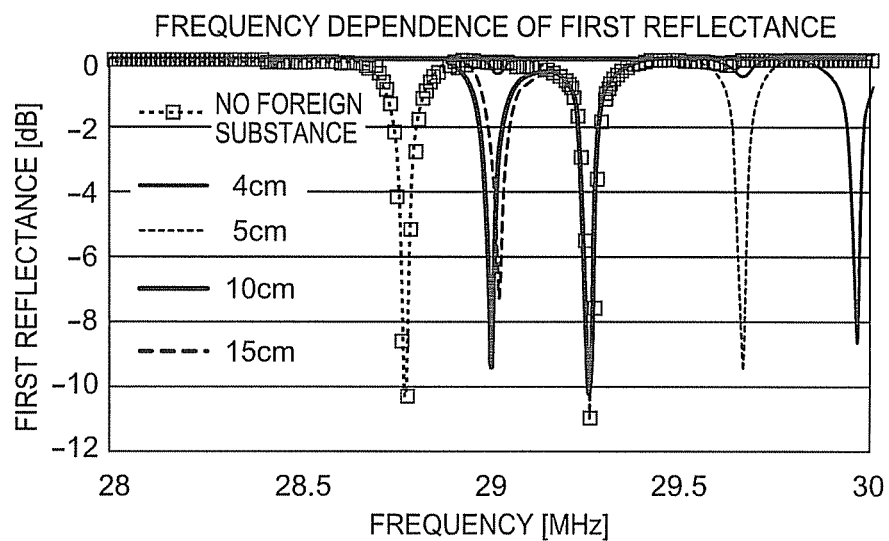
FIGS. 14A and 14B are views showing simulations of frequency dependence of the first and second reflectances, respectively.
Figure 14B:
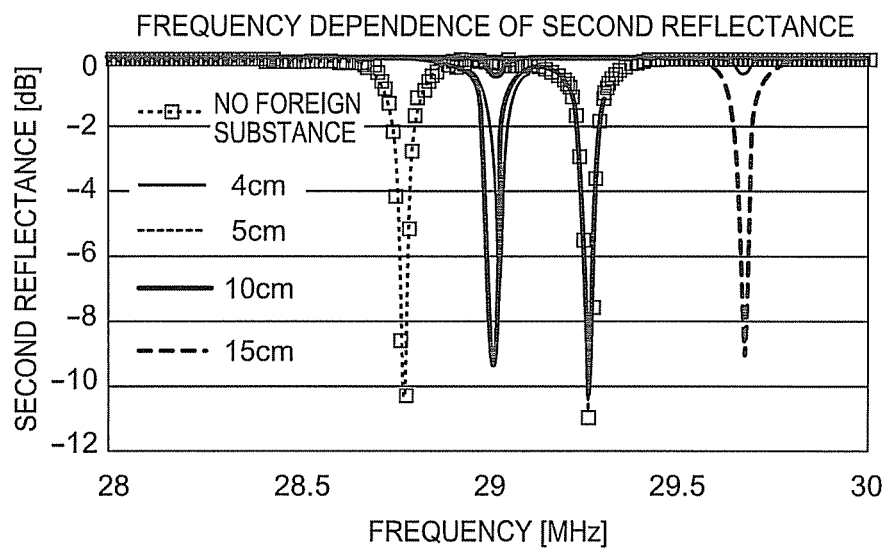

FIGS. 14A and 14B are views showing simulations of frequency dependence of the first and second reflectances, respectively, when a foreign substance (metal plate) is xcm apart from the power transmission coil 110, provided that a distance of 20 cm is set between the power transmission coil 110 and the power receiving coil 210. FIG. 14A shows the frequency dependence of the first reflectance for five cases. In FIG. 14A, a case having no foreign substance is represented with a thin dotted line and white squares. Another four cases having the foreign substances (metal plate) 4 cm, 5 cm, 10 cm, and 15 cm apart from the power transmission coil 110 are represented with a thin solid line, a thin dotted-line, a bold dotted-line, and a bold solid line, respectively. FIG. 14B shows the frequency dependence of the second reflectance for five cases. In FIG. 14B, a case having no foreign substance is represented with a thin dotted-line and white squares. Another four cases having the foreign substances (metal plate) 4 cm, 5 cm, 10 cm, and 15 cm apart from the power transmission coil 110 are represented with a thin solid line, a thin dotted-line, a bold dotted-line, and a bold solid line, respectively.

When a foreign substance is present near the power transmission coil 110, the number of the first peaking frequencies is one, and the first peaking frequency becomes high. When a foreign substance is present apart from the power transmission apparatus 100, the number of the first peaking frequencies is two, and the two frequencies approach two resonance frequencies specific to the power transmission coil 110. When a foreign substance is present between the power transmission coil 110 and the power receiving coil 210, the number of the first peaking frequencies is two. The two first peaking frequencies are different from the first peaking frequency of the case having no foreign substance. These hold true for the power receiving coil 210.

On the basis of the above-mentioned, the foreign-substance detecting unit 300 according to the first embodiment can detect a foreign substance in the following steps. Firstly, the foreign-substance detecting unit 300 counts the number of the first and second peaking frequencies. Secondly, the foreign-substance detecting unit 300 judges that a foreign substance is present if either one of the two numbers is one and the other is two, provided that the two numbers are the number of the first peaking frequencies and the number of the second peaking frequencies. Thirdly, the foreign-substance detecting unit 300 judges that a foreign substance is present if at least one of the two first peaking frequencies or at least one of the two second peaking frequencies coincides with a resonance frequency specific to the power transmission coil 110 or the power receiving coil 210, provided that the number of the first peaking frequencies or the number of the second peaking frequencies is two. In this way, the foreign-substance detecting unit 300 can detect a foreign substance simply.

Furthermore, when the number of the first peaking frequencies or the number of the second peaking frequencies is two, the power transmission apparatus 100 or the power receiving apparatus 200 can measure the coupling coefficient between the power transmission coil 110 and the power receiving coil 210.

Figure 15:
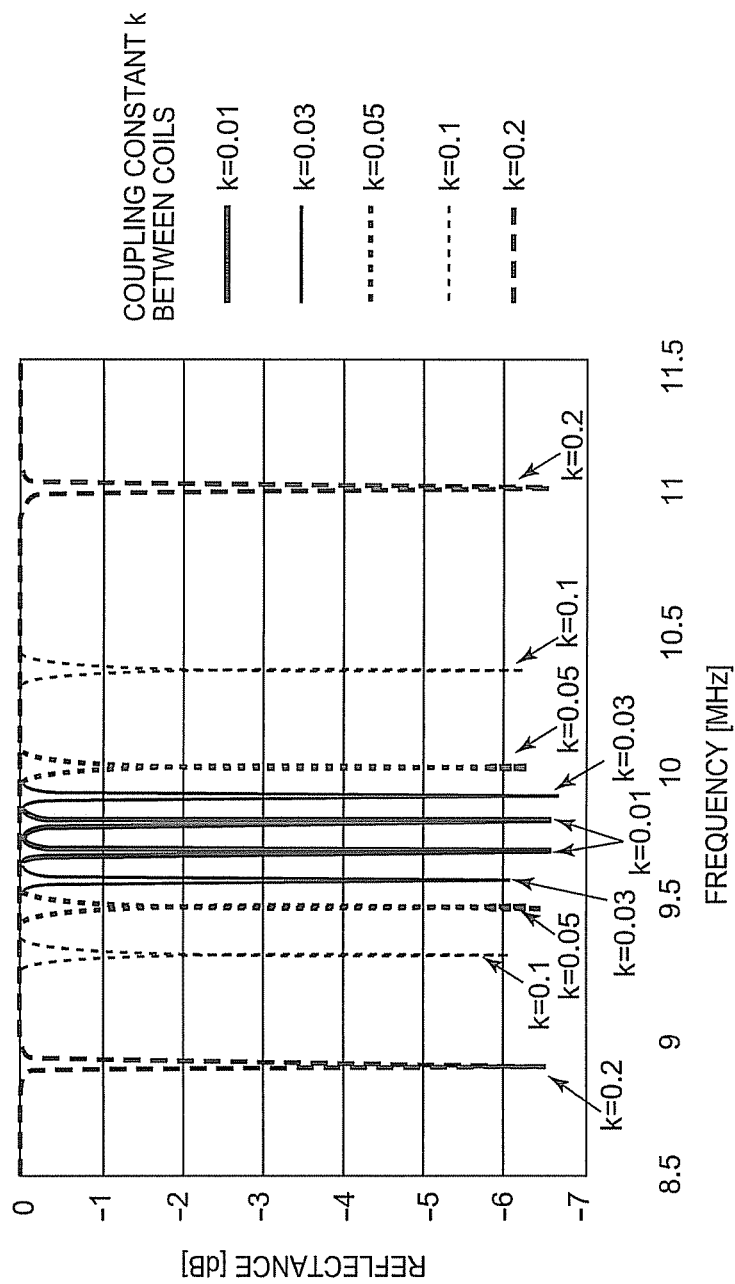
FIG. 15 is a view showing a relation between the first reflectance and a coupling coefficient of coils.

FIG. 15 is a view showing calculations of the first reflectance obtained using an equivalent circuit simulator with changing a coupling coefficient between the power transmission coil 110 and the power receiving coil 210. The calculations show the following tendency. That is, the larger the coupling coefficient k between the power transmission coil 110 and the power receiving coil 210, the larger a difference $\Delta f$ between the two first peaking frequencies.

Figure 16:
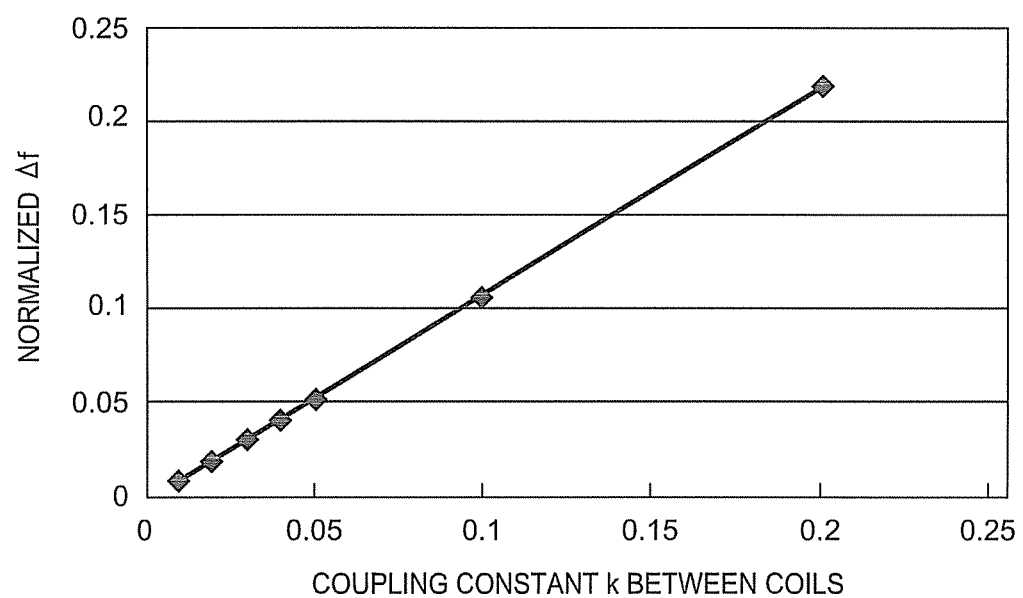
FIG. 16 is a view showing a normalized difference Δf between the two first peaking frequencies and the coupling coefficient.

FIG. 16 is a view showing a relation between a normalized $\Delta f$ and the coupling coefficient. The normalized $\Delta f$ is the difference $\Delta f$ between the two first peaking frequencies divided by the resonance frequency specific to the power transmission coil 110. There is a direct proportional relation between the normalized $\Delta f$ and the coupling coefficient.

The power transmission apparatus 100 or the power receiving apparatus 200 can measure the coupling coefficient between the power transmission coil 110 and the power receiving coil 210 using this relation. And a theoretical power transmission efficiency is calculated from the coupling coefficient between the power transmission coil 110 and the power receiving coil 210. The foreign-substance detecting unit 300 precisely detects a foreign substance from a change in the power transmission efficiency during power transmission as described in the modification 1 of the first and second embodiments if the theoretical power transmission efficiency is calculated. However, no presence of a foreign substance is required between the power transmission coil 110 and the power receiving coil 210 for a period of time to measure the degree of coupling therebetween.

Modification 3 of First and Second Embodiments

Figure 17:
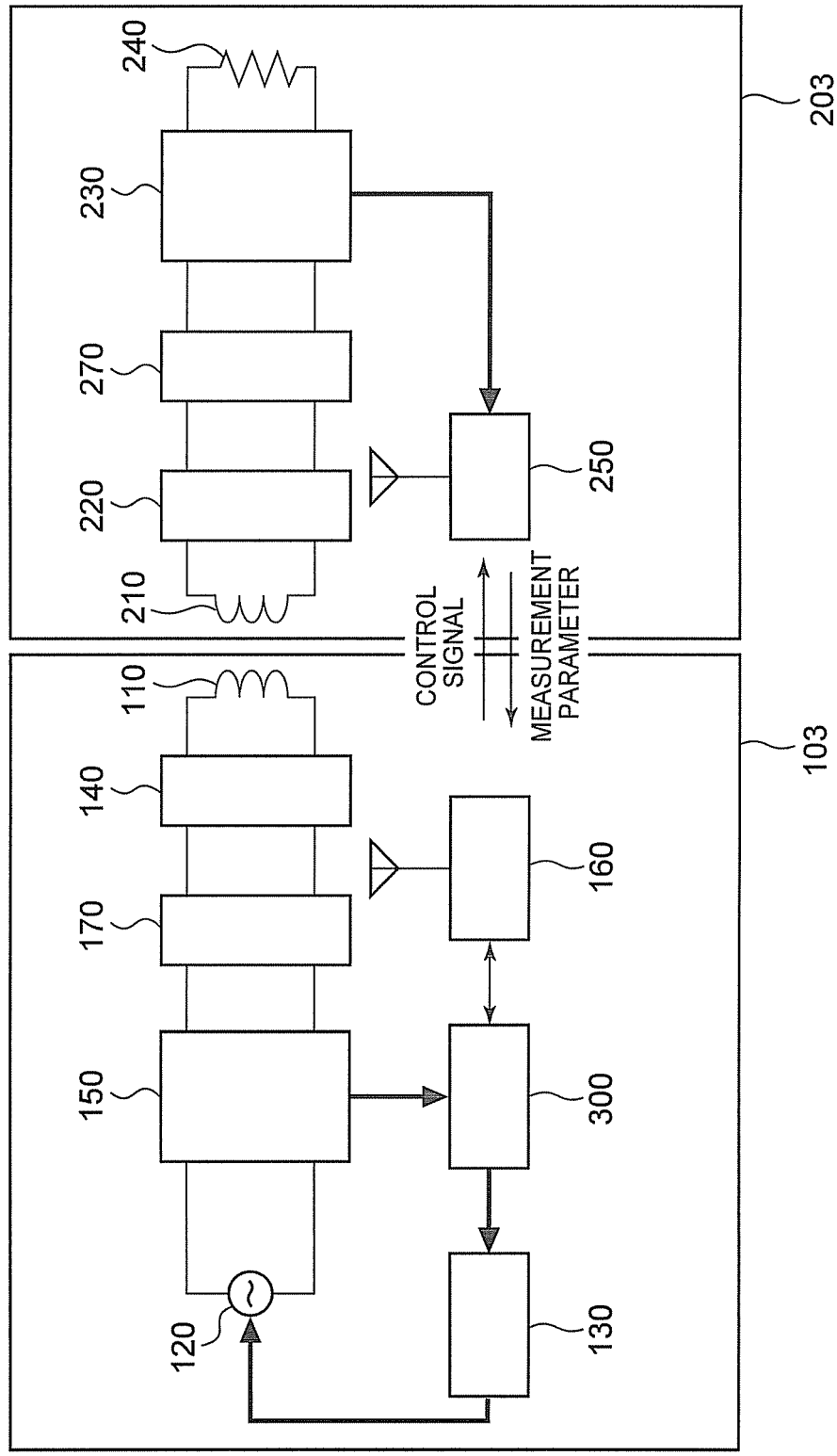
FIG. 17 is a view showing a power transmission system according to a modification 3 of the first and second embodiments.

FIG. 17 is a view showing a power transmission system 14 according to a modification 3 of the first and second embodiments. The power transmission apparatus 100 is different from the first and second embodiments in that the power transmission apparatus 100 is further provided with a first matching circuit 170 and the power receiving apparatus 200 is further provided with a second matching circuit 270. The first matching circuit 170 performs impedance matching between the voltage supply 120 and the power transmission coil 110. The second matching circuit 270 performs impedance matching between the power receiving coil 210 and the load 240. Thus, the power transmission efficiency can be enhanced by performing impedance matching between the power transmission apparatus 103 and the power receiving apparatus 203.

An example will be described below. In the example, a power transmission apparatus 103 is provided with a voltage supply 120, a first loop connected to the voltage supply 120, and a power transmission coil 110 (self-resonance coil) electromagnetically coupled to the first loop. A power receiving apparatus 203 is provided with a power receiving coil 210 (self-resonance coil), a second loop electromagnetically coupled to the power receiving coil 210, and a load 240 connected to the second loop. The coupling between the first loop and the power transmission coil 110, and the coupling between the power receiving coil 210 and the second loop are changed to perform impedance matching.

Figure 18:
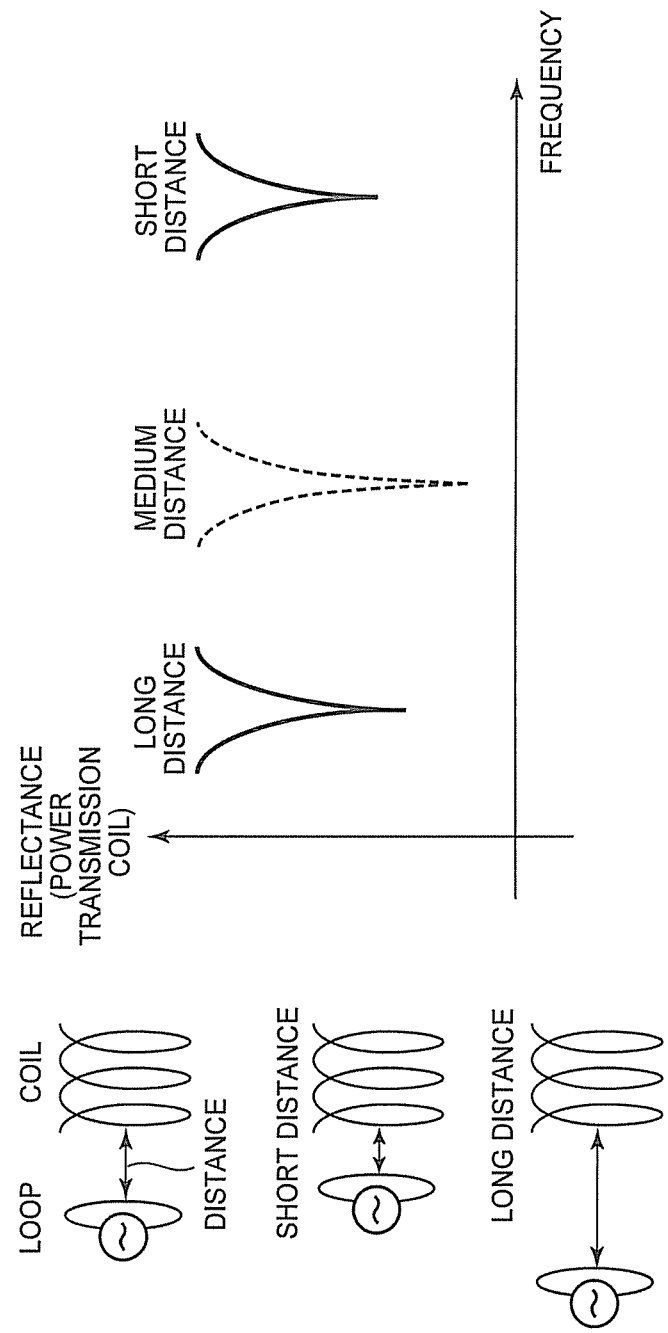
FIG. 18 is a schematic view showing the first peaking frequency.

FIG. 18 is a schematic view showing the first peaking frequency depending on a distance between the first loop and the power transmission coil 110. The first peaking frequency for a short distance between the first loop and the power transmission coil 110 is higher than the first peaking frequency for a long distance therebetween. The short and long distances correspond to strong coupling and weak coupling between the first loop and the power transmission coil 110, respectively. The distance (coupling) between the first loop and the power transmission coil 110 is changed in order to perform impedance matching, thereby changing also the first peaking frequency. In addition, a resonance circuit includes the first loop and the power transmission coil 110 in the configuration using the first loop and the power transmission coil 110. The first peaking frequency derived from a local minimum reflectance without any foreign substance corresponds to a first resonance frequency in the configuration. The first resonance frequency changes with the degree of the coupling between the first loop and the power transmission coil 110.

Then, when the power transmission apparatus 103 and the power receiving apparatus 203 locate to have no influence on each other, the first matching circuit 170 of the power transmission apparatus 103 adjusts the distance between the first loop and the power transmission coil 110 to perform impedance matching so that the first reflectance reaches a local minimum. Moreover, the second matching circuit 270 of the power receiving apparatus 203 adjusts the distance between the power receiving coil 210 and the second loop to perform impedance matching so that the second reflectance reaches a local minimum. The foreign-substance detecting unit 300 uses the shift amounts of the first peaking frequency and the second or third peaking frequency to judge whether or not a foreign substance is present. This enables it to precisely detect the foreign substance. When the power transmission apparatus 103 and the power receiving apparatus 203 locate to influence each other, the first matching circuit 170 of the power transmission apparatus 103 adjusts the distance between the first loop and the power transmission coil 110 to perform impedance matching so that the first reflectance reaches a local minimum. Moreover, the second matching circuit 270 of the power receiving apparatus 203 adjusts the distance between the power receiving coil 210 and the second loop to perform impedance matching so that second reflectance reaches a local minimum. The foreign-substance detecting unit 300 uses the shift amounts of the first peaking frequency and the second or third peaking frequency to judge whether or not a foreign substance is present. This enables it to precisely detect the foreign substance.

Alternatively, whatever has a mechanism to perform impedance matching may be employed for the first matching circuit 170 and the second matching circuit 270, and the matching circuits are not limited to a self-resonance coil and a loop. The first matching circuit 170 and the second matching circuit 270 may be "L" and "C" which are connected to a line connecting the voltage supply and the power transmission coil, or a line connecting the power receiving coil 210 and the load 240. The first matching circuit 170 and the second matching circuit 270 can be applied to a power transmission system having a variable resonance frequency during impedance matching.

Operational Mode of Foreign-Substance Detecting Unit

An operational mode of the foreign-substance detecting unit 300 explained in the first embodiment, the second embodiment, and their modifications will be described below.

Figure 19:
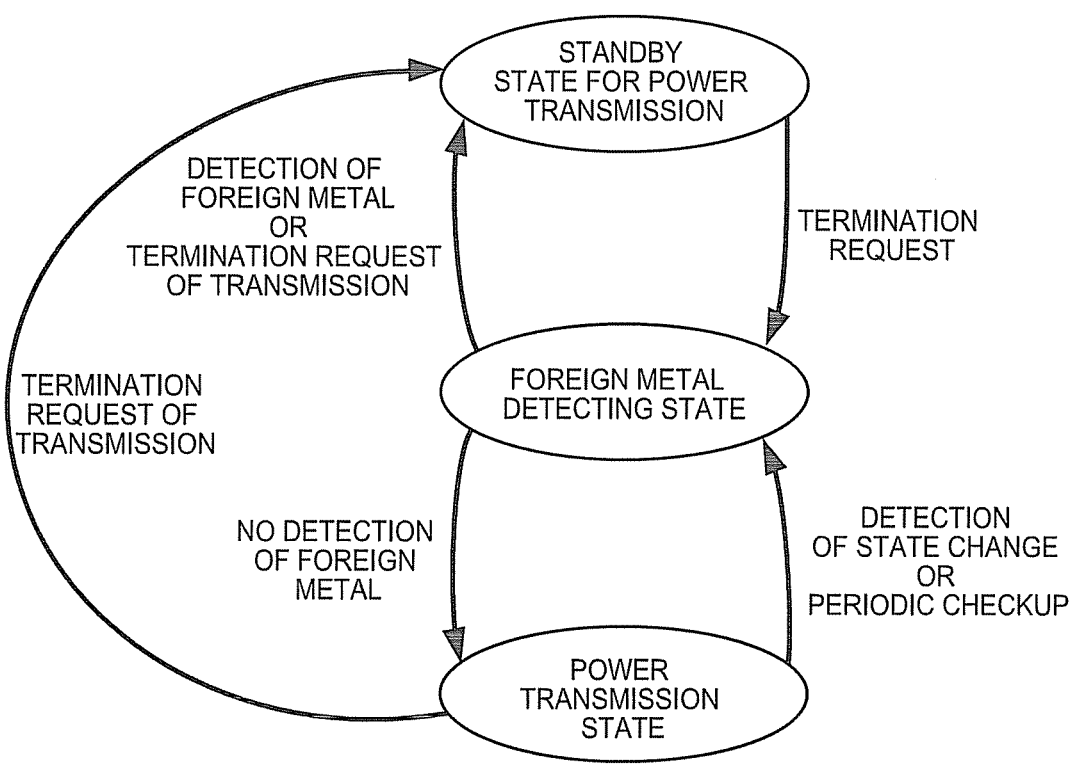
FIG. 19 is a view showing a first example of state transition of the foreign-substance detecting unit.

FIG. 19 is a view showing a first example of state transition of the foreign-substance detecting unit 300. The foreign-substance detecting unit 300 has 3 states of a "standby state", a "foreign substance detection state", and a "power transmission state."

Firstly, the foreign-substance detecting unit 300 is in a "standby state", when the power transmission systems 10 to 13 transmit no electric power. Secondly, when the power transmission apparatus 100 (a first communication unit 160) receives a power transmission demand from the power receiving apparatus 200 or other apparatus, the foreign-substance detecting unit 300 transits to the "foreign substance detection state." The foreign-substance detecting unit 300 tries to detect a foreign substance in the "foreign substance detection state" in such a manner described above. The foreign substance may be present between the power transmission coil 110 and the power receiving coil 210.

When a foreign substance is detected in the "foreign substance detection state," the foreign-substance detecting unit 300 transmits "power transmission error" to the power receiving apparatus 200 via the first communication unit 160, and transits to the "standby state." At this time, the power transmission apparatus 100 does not transmit electric power to the power receiving apparatus 200.

When no foreign substance is detected in "the foreign substance detection state," the foreign-substance detecting unit 300 transits to the "power transmission state." When a predetermined period of time has passed in the "power transmission state" (periodically), the foreign-substance detecting unit 300 transits to the "foreign substance detection state" to check no foreign substance. The predetermined period of time depends on applications or output power of the power transmission apparatus 100, etc. and is set to be sufficiently short in order to prevent the foreign substance from being heated.

The foreign-substance detecting unit 300 continues to measure the first reflectance, the second reflectance, and the power transmission efficiency, etc. at any time (periodically) to detect a foreign substance if the first reflectance, the second reflectance, and the power transmission efficiency vary to exceed a threshold value within the predetermined period of time. In this way, it is possible to immediately detect a foreign substance inserted between the power transmission coil 110 and the power receiving coil 210 during power transmission and to minimize a risk to supply electric power to the foreign substance.

The foreign-substance detecting unit 300 detects a foreign substance in the "power transmission state" on the basis of the lower power transmission efficiency or the shift of the peaking frequencies to transit to the "foreign substance detection state." When the power transmission apparatus 100 (first communication unit 160) receives a termination request of power transmission from the power receiving apparatus 200 or other apparatus, the foreign-substance detecting unit 300 transits to the "standby state."

Figure 20:
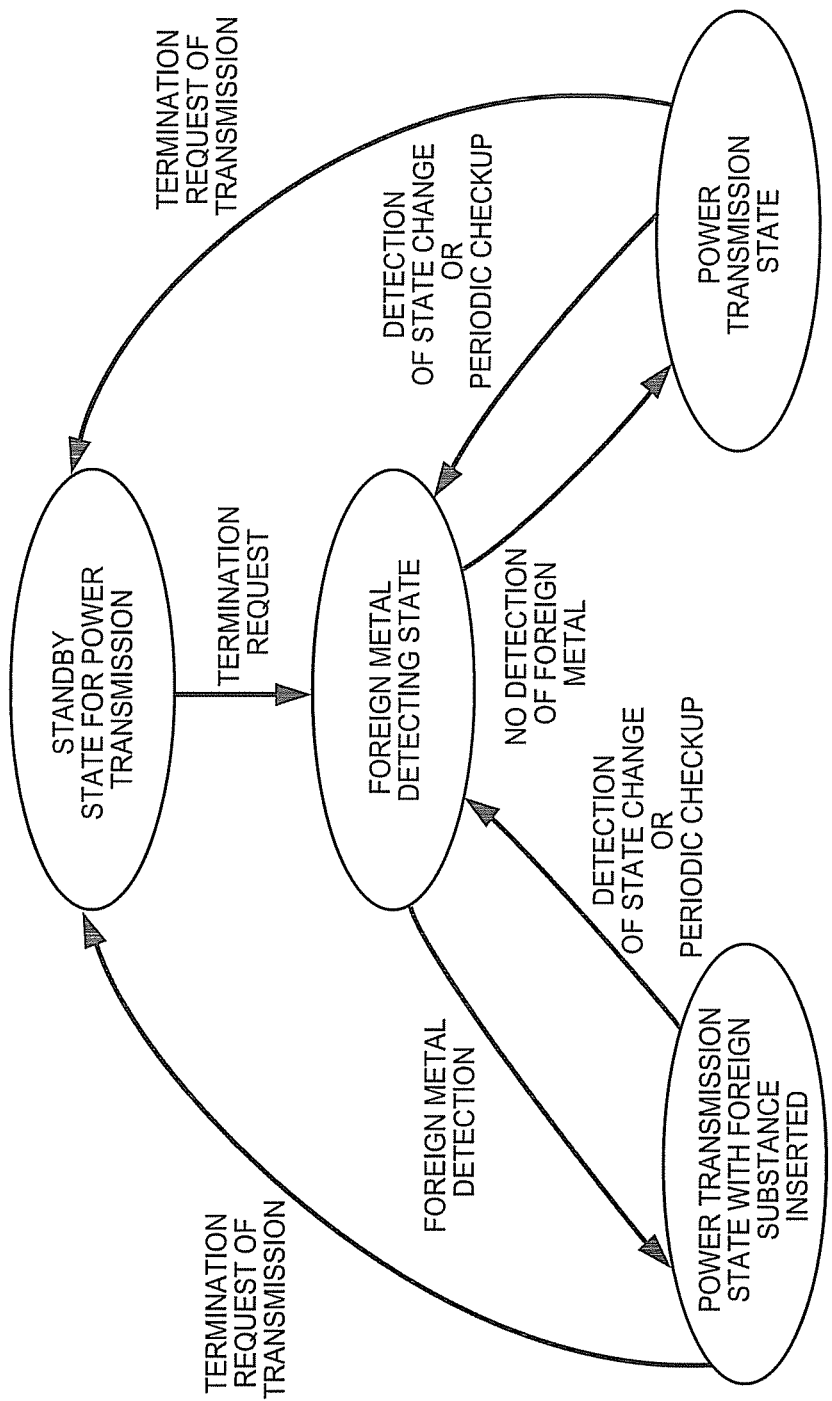
FIG. 20 is a view showing a second example of state transition of the foreign-substance detecting unit.

FIG. 20 is a view showing a second example of state transition of the foreign-substance detecting unit 300. The foreign-substance detecting unit 300 has four states of a "standby state", a "foreign substance detection state", a "power transmission state", and a "power transmission state involving foreign substance detection." FIG. 20 is different from FIG. 19 in the following point. Even if a foreign substance is detected in the "foreign substance detection state," the power transmission apparatus 100 transmits electric power to the power receiving apparatus 200.

In FIG. 20, when a foreign substance is detected in the "foreign substance detection state", the foreign-substance detecting unit 300 transits to the "power transmission state involving foreign substance detection." The foreign-substance detecting unit 300 may control the power transmission apparatus 100 to reduce its output power for power transmission, or may control other power transmission coils 110 not relevant to the detected foreign substance to transmit electric power, or may control the power transmission apparatus 100 so that electric power is not supplied mistakenly to the foreign substance in the "power transmission state involving foreign substance detection."

Figure 21:
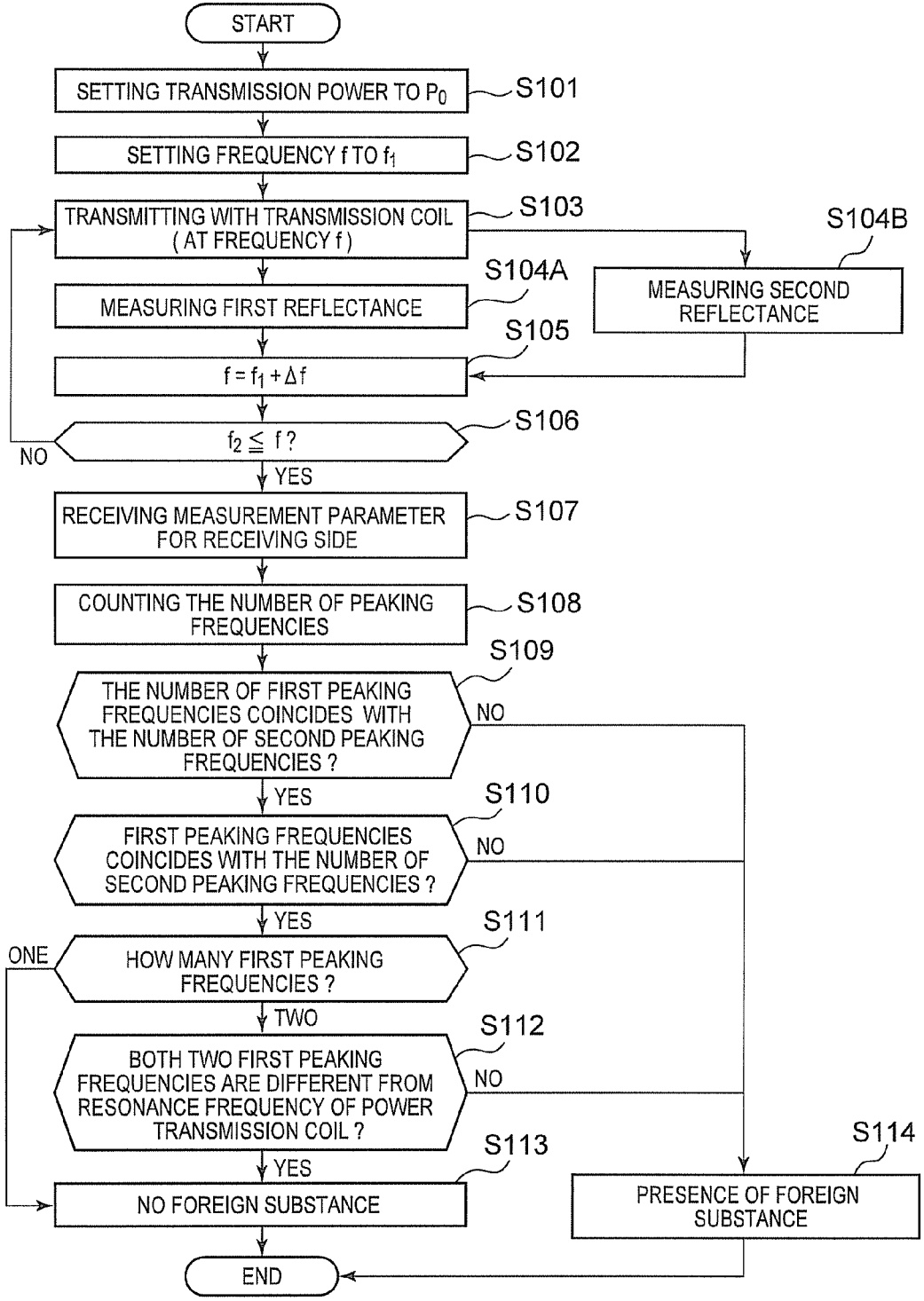
FIG. 21 is a flow chart showing an operation flow in a "foreign substance detection state" of the foreign-substance detecting unit according to the first embodiment and its modifications.

Operation Flow of Foreign-Substance Detecting Unit According to the First Embodiment and its Modifications FIG. 21 is a flow chart showing an operation flow in the "foreign substance detection state" of the foreign-substance detecting unit 300 according to the first embodiment and its modifications.

First, the power supply controller 130 sets the output power of the voltage supply 120 to $P_0$ to use the output power for trial power transmission just before detecting a foreign substance (Step S101). In order to prevent the excessive incorrect power supply to the foreign substance, the power supply controller 130 sets the output power $P_0$ to a small value.

Next, the power supply controller 130 sets the frequency f of the first AC signal from the voltage supply 120 to the frequency $f_1$ (Step S102).

Next, the voltage supply 120 outputs the output power $P_0$ and the AC signal of the frequency f (Step S103).

Next, the first measurement unit 150 measures the first reflectance to memorize the data thereof to a storage unit to be built therein (Step S104A).

Moreover, the second measurement unit 230 measures the second reflectance to memorize the data thereof to a storage unit to be built therein (Step S104B).

Next, the power supply controller 130 sets the frequency f of the first AC signal outputted from the voltage supply 120 to $f_1+\Delta f$ (Step S105).

If f is smaller than $f_2$ ("no" at Step S106), the steps from S101 to S105 are repeated.

If f is larger than $f_2$ ("no" at Step S106), the foreign-substance detecting unit 300 requires and acquires the measurement by the second measurement unit 230 of the power receiving apparatus 200 (Step S107) v is the first communication unit 160. The measurement includes the frequency dependence of the second reflectance or the second peaking frequency. Moreover, the foreign-substance detecting unit 300 acquires the measurement (the frequency dependence of the first reflectance or the first peaking frequency) by the first measurement unit 150. Alternatively, the first and second measurement units or the foreign-substance detecting unit 300 may use the frequency dependence of the first and second reflectances to identify the first and second peaking frequencies. The foreign-substance detecting unit 300 compares the reflectance at the local minimum, the first maximum of the reflectance at a frequency higher than the frequency at the local minimum, and the second maximum of the reflectance at a frequency lower than the frequency at the local minimum to judge that f is not the peaking frequency if two differences do not exceeds a threshold value. Here, one of the two differences means a difference between the reflectance at the local minimum and the first maximum. The other means a difference between the reflectance at the local minimum and the second maximum. Alternatively, the threshold value is determined on the basis of the reflectance at the local minimum, and the half value (+3 dB) of a local minimum reflectance may be employed as the threshold value.

Next, the foreign-substance detecting unit 300 counts the number of the first peaking frequencies and the number of the second peaking frequencies (Step S108). If the number of the first peaking frequencies differs from the number of the second peaking frequencies ("no" at Step S109), the foreign-substance detecting unit 300 judges that a foreign substance is present (Step S114).

If the number of the first peaking frequencies is equal to the number of the second peaking frequencies ("yes" at Step S109), the foreign-substance detecting unit 300 judges whether or not the first peaking frequencies are equal to the second peaking frequencies (Step S110).

If the first peaking frequency is different from the second peaking frequency ("no" at Step S110), the foreign-substance detecting unit 300 judges that a foreign substance is present (Step S114).

If the first peaking frequency and the second peaking frequency are equal to each other ("yes" at Step S110), and if the number of the first peaking frequencies is equal to one ("one" at the Step S111), the foreign-substance detecting unit 300 judges that no foreign substance is present (Step S113).

If the first peaking frequency and the second peaking frequency are equal to each other ("yes" at Step S110), and if the number of the first peaking frequencies is equal to three or more, the foreign-substance detecting unit 300 goes into errors.

If the first peaking frequency and the second peaking frequency are equal to each other ("yes" at Step S110), and if the number of the first peaking frequencies is equal to two ("two" at Step S111), the foreign-substance detecting unit 300 judges whether or not both the two first peaking frequencies are different from the first resonance frequency of the power transmission coil 110.

If either one of the two first peaking frequencies is equal to the first resonance frequency of the power transmission coil 110 ("no" at Step S112), the foreign-substance detecting unit 300 judges that a foreign substance is present (Step S114).

If both the two first peaking frequencies differ from the first resonance frequency of the power transmission coil 110 ("yes" at Step S112), the foreign-substance detecting unit 300 judges that no foreign substance is present (Step S113).

In this way, a foreign substance detecting unit is capable of detecting a foreign substance precisely and simply. The foreign substance detecting unit is capable of detecting a foreign substance not only near the power transmission coil but also widely far therefrom.

<Flow of Foreign-Substance Detecting Unit According to Second Embodiment and its Modification>

Figure 22:
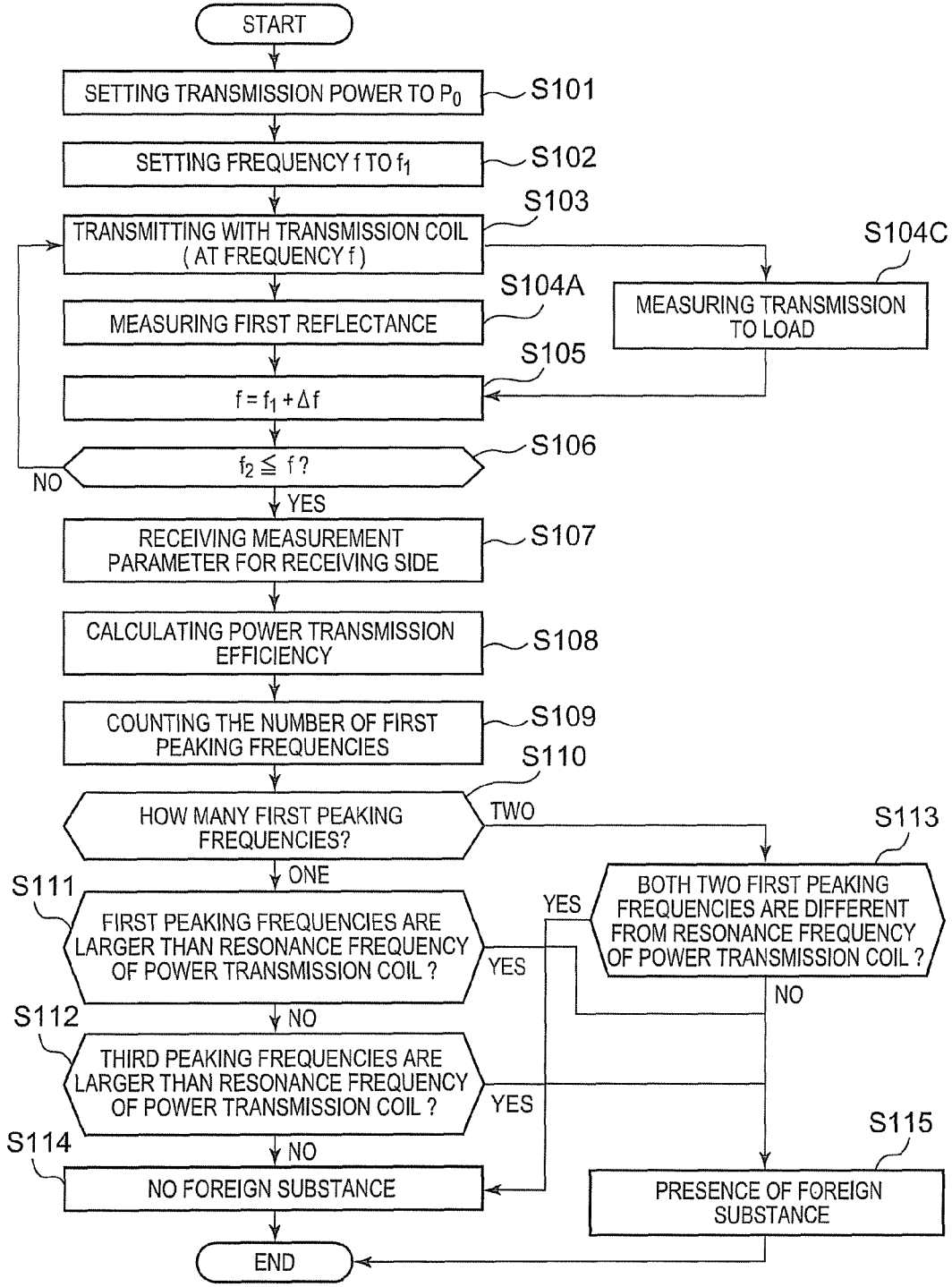
FIG. 22 is a flow chart showing an operation flow in the "foreign substance detection state" of the foreign-substance detecting unit according to the second embodiment and its modifications.

FIG. 22 is a flow chart showing an operation flow for the foreign-substance detecting unit 300 according to a second embodiment and its modification in the "foreign substance detection state". In addition, Steps from S101 to S107 are the same as that of FIG. 21. Therefore, explanations about S101 to S107 are omitted. S104C is different from S104 in that the third measurement unit measures the power supply to the load as mentioned above.

If $f_1$ is more than $f_2$ ("yes" at Step S106), the foreign-substance detecting unit 300 demands and acquires the measurement (frequency dependence of power transmission to the load) by the third measurement unit 231 of the power receiving apparatus 200 (Step S107). Moreover, the foreign-substance detecting unit 300 acquires the output electric power $P_0$ of the voltage supply 120 and the measurement (the frequency dependence of the first reflectance) of the first measurement unit 150 (Step S107).

Next, the foreign-substance detecting unit 300 uses the frequency dependence of second electric power, the output electric power $P_0$ of the voltage supply 120, and the frequency dependence of the first reflectance (electric power reflectance) to calculate the frequency dependence of the power transmission efficiency (Step S108). Then the foreign-substance detecting unit 300 identifies the first and third peaking frequencies.

Next, the foreign-substance detecting unit 300 counts the number of the first peaking frequencies (Step S109).

If the number of the first peaking frequencies is one ("one" at Step S110) and the first peaking frequency is higher than the first resonance frequency of the power transmission coil 110 ("yes" at Step S111), or if the number of the first peaking frequencies is one ("one" at Step S110) and the third peaking frequency is larger than the first resonance frequency of the power transmission coil 110 ("yes" at Step S112), the foreign-substance detecting unit 300 judges that a foreign substance is present (Step S115).

If the number of the first peaking frequencies is one ("one" at Step S110) and the first peaking frequency is not higher than the first resonance frequency of the power transmission coil 110 ("no" at Step S111), or if the number of the first peaking frequencies is one ("one" at Step S110) and the third peaking frequency is not higher than the first resonance frequency of the power transmission coil 110 ("no" at Step S112), the foreign-substance detecting unit 300 judges that no foreign substance is present (Step S114).

If the number of the first peaking frequencies is three or more, the foreign-substance detecting unit 300 goes into errors.

If the number of the first peaking frequencies is two ("two" at Step S110) and both the two first peaking frequencies differ from the first resonance frequency of the power transmission coil 110 ("yes" at Step S113), the foreign-substance detecting unit 300 judges that no foreign substance is present (Step S114).

If the number of the first peaking frequencies is two ("two" at Step S110) and both the two first peaking frequencies are equal to the first resonance frequency of the power transmission coil 110 ("no" at Step S113), the foreign-substance detecting unit 300 judges that a foreign substance is present (Step S115).

In this way, a foreign substance detecting unit is capable of detecting a foreign substance precisely and simply. The foreign substance detecting unit is capable of detecting the foreign substance not only near the power transmission coil but also widely far therefrom.

In addition, the present invention is not limited to the above-mentioned embodiments as it is, and the elements of the invention can be modified for the reduction to practice thereof. What combined two or more factors of the examples in a technically possible range is included in the scope of the invention as long as the subject matter of the invention is included therein. For example, several elements may be removed from all the elements specified in the embodiments described above. Furthermore, the elements among the different embodiments may be combined.

As described above, according to an embodiment, a power transmission system includes a power transmission apparatus, a power receiving apparatus, and a foreign-substance detecting unit. The power transmission apparatus has a power transmission coil to wirelessly transmit electric power. The power receiving apparatus has a power receiving coil to wirelessly receive electric power from the power transmission apparatus. The foreign-substance detecting unit detects a foreign substance which is present between the power transmission coil and the power receiving coil. In addition, the power transmission apparatus includes a voltage supply, a power supply controller, the power transmission coil, and a first measurement unit. The voltage supply is frequency-variable and capable of outputting a first AC signal. The power supply controller varies a frequency of the first AC signal in a frequency range from a first frequency to a second frequency. The power transmission coil resonates at a first resonance frequency and generates a magnetic field by receiving the first AC signal. The first measurement unit measures a first reflectance in the frequency range two or more times. The first reflectance is at least one of a voltage reflectance of the first AC signal, an AC reflectance of the first AC signal, and a power reflectance of the first AC signal. In addition, the power receiving apparatus includes the power receiving coil and a second measurement unit. The power receiving coil resonates at a second resonance frequency and generates a second AC signal by receiving the magnetic field. The second AC signal is passed through a load. The second measurement unit measures a second reflectance in the frequency range two or more times. The second reflectance is at least one of a voltage reflectance of the second AC signal, an AC reflectance of the second AC signal, and a power reflectance of the second AC signal. In addition, the foreign-substance detecting unit uses a first peaking frequency and a second peaking frequency to detect the foreign substance. The first peaking frequency is a frequency at which the first reflectance reaches a local minimum. The second peaking frequency is a frequency at which the second reflectance reaches a local minimum.

According to another embodiment, a power transmission system includes a power transmission apparatus, a power receiving apparatus, a foreign-substance detecting unit. The power transmission apparatus has a power transmission coil to wirelessly transmit electric power. The power receiving apparatus has a power receiving coil to wirelessly receive electric power from the power transmission apparatus. The foreign-substance detecting unit detects a foreign substance which is present between the power transmission coil and the power receiving coil. In addition, the power transmission apparatus includes a voltage supply, a power supply controller, the power transmission coil, and a first measurement unit. The voltage supply is frequency-variable and capable of outputting a first AC signal. The power supply controller varies a frequency of the first AC signal in a frequency range from a first frequency to a second frequency. The power transmission coil resonates at a first resonance frequency and generates a magnetic field by receiving the first AC signal. The first measurement unit measures a first reflectance and first power in the frequency range two or more times. The first reflectance is at least one of a voltage reflectance of the first AC signal, an AC reflectance of the first AC signal, and a power reflectance of the first AC signal. The first power is transmitted by the power transmission coil. In addition, the power receiving apparatus includes the power receiving coil and a second measurement unit. The power receiving coil resonates at a second resonance frequency and generates a second AC signal by receiving the magnetic field. The second measurement unit measures second power in the frequency range two or more times. The second power is supplied to a load. In addition, the foreign-substance detecting unit uses a first peaking frequency and a third peaking frequency to detect the foreign substance. The first peaking frequency is a frequency at which the first reflectance reaches a local minimum. The third peaking frequency is a frequency at which a power transmission efficiency reaches a local maximum. The power transmission efficiency is determined by the first electric power and the second electric power.

According to another embodiment, a power transmission apparatus using a transmission coil to wirelessly transmit electric power to a power receiving apparatus having a power receiving coil is provided. The power transmission apparatus includes a voltage supply, a power supply controller, a power transmission coil, a first measurement unit, and a receiving unit. The voltage supply is frequency-variable and capable of outputting a first AC signal. The power supply controller varies a frequency of the first AC signal in a frequency range from a first frequency to a second frequency. The power transmission coil resonates at a first resonance frequency and generates a magnetic field by receiving the first AC signal. The first measurement unit measures a first reflectance in the frequency range two or more times. The first reflectance is at least one of a voltage reflectance of the first AC signal, an AC reflectance of the first AC signal, and a power reflectance of the first AC signal. The receiving unit receives a piece of information of a second peaking frequency at which at least one of a voltage reflectance of a second AC signal, a current reflectance of the second AC signal, and a power reflectance of the second AC signal reaches a local minimum. The second AC signal is generated by the magnetic field via the power receiving coil. In addition, a foreign substance between the power transmission coil and the power receiving coil is detected by the use of a first peaking frequency at which the first reflectance reaches a local minimum and the second peaking frequency.

According to another embodiment, a power transmission apparatus using a transmission coil to wirelessly transmit electric power to a power receiving apparatus having a power receiving coil is provided. The power transmission apparatus includes a voltage supply, a power supply, a power transmission coil, a first measurement unit, and a receiving unit. The voltage supply is frequency-variable and capable of outputting a first AC signal. The power supply controller varies a frequency of the first AC signal in a frequency range from a first frequency to a second frequency. The power transmission coil resonates at a first resonance frequency and generates a magnetic field by receiving the first AC signal. The first measurement unit measures a first reflectance and first electric power in the frequency range two or more times. The first reflectance is at least one of a voltage reflectance of the first AC signal, an AC reflectance of the first AC signal, and a power reflectance of the first AC signal. The first electric power is transmitted by the power transmission coil. The receiving unit receives a piece of information of second electric power of a second AC signal to be generated by the magnetic field via the power receiving coil. In addition, a foreign substance between the power transmission coil and the power receiving coil is detected by the use of a first peaking frequency at which the first reflectance reaches a local minimum and a third peaking frequency at which a power transmission efficiency reaches a local maximum. The power transmission efficiency is determined by the first electric power and the second electric power.

While a certain embodiment of the invention has been described, the embodiment has been presented by way of examples only, and is not intended to limit the scope of the inventions. Indeed, the novel elements and apparatuses described herein may be embodied in a variety of other forms; furthermore, various omissions, substitutions and changes in the form of the methods described herein may be made without departing from the spirit of the invention. The accompanying claims and their equivalents are intended to cover such forms or modifications as would fall within the scope and spirit of the invention.

What is claimed is:

1. A wireless power transmission system comprising:
a power transmission apparatus having a power transmission coil to wirelessly transmit electric power;
a power receiving apparatus having a power receiving coil to wirelessly receive electric power from the power transmission apparatus; and
a foreign-substance detector to detect a foreign substance which is present between the power transmission coil and the power receiving coil,
wherein
the power transmission apparatus includes:
a voltage supply to be frequency-variable and capable of outputting a first AC signal;
a power supply controller that varies a frequency of the first AC signal in a frequency range from a first frequency to a second frequency;
the power transmission coil to resonate at a first resonance frequency and to generate a magnetic field by receiving the first AC signal; and
a first measurement unit to measure a first reflectance between the voltage supply and the power transmission coil in the frequency range two or more times, the first reflectance being at least one of a voltage reflectance of the first AC signal, an AC reflectance of the first AC signal, and a power reflectance of the first AC signal;
wherein
the power receiving apparatus includes:
the power receiving coil to resonate at a second resonance frequency and to generate a second AC signal by receiving the magnetic field, the second AC signal being passed through a load; and
a second measurement unit to measure a second reflectance between the power receiving coil and the load in the frequency range two or more times, the second reflectance being at least one of a voltage reflectance of the second AC signal, an AC reflectance of the second AC signal, and a power reflectance of the second AC signal; and
wherein
the foreign-substance detector acquires a first peaking frequency from the first measurement unit and a second peaking frequency from the second measurement unit, and detects the foreign substance by the use of shift amounts of the first peaking frequency and the second peaking frequency, the first peaking frequency being a frequency at which the first reflectance reaches a local minimum, the second peaking frequency being a frequency at which the second reflectance reaches a local minimum.

2. The system according to claim 1, wherein
the power receiving apparatus further includes a load controller to control the resistance value of the load to be constant during measurement periods of time for the first measurement unit and the second measurement unit.

3. The system according to claim 1, wherein
the foreign-substance detector judges that the foreign substance is present if the first peaking frequency is higher than the first resonance frequency.

4. The system according to claim 1, wherein
the foreign-substance detector judges that the foreign substance is present if the second peaking frequency is higher than the second resonance frequency.

5. The system according to claim 1, wherein
the foreign-substance detector further uses the number of local minimums of the first reflectance in the frequency range to detect the foreign substance.

6. A wireless power transmission system comprising:
a power transmission apparatus having a power transmission coil to wirelessly transmit electric power;

a power receiving apparatus having a power receiving coil to wirelessly receive electric power from the power transmission apparatus; and a foreign-substance detector to detect a foreign substance which is present between the power transmission coil and the power receiving coil, wherein the power transmission apparatus includes:
- a voltage supply to be frequency-variable and capable of outputting a first AC signal;
- a power supply controller that varies a frequency of the first AC signal in a frequency range from a first frequency to a second frequency;
- the power transmission coil to resonate at a first resonance frequency and to generate a magnetic field by receiving the first AC signal;
- a first measurement unit to measure a first reflectance between the voltage supply and the power transmission coil and first electric power in the frequency range two or more times, the first reflectance being at least one of a voltage reflectance of the first AC signal, an AC reflectance of the first AC signal, and a power reflectance of the first AC signal, the first electric power being transmitted by the power transmission coil;

wherein the power receiving apparatus includes:
- the power receiving coil to resonate at a second resonance frequency and to generate a second AC signal in response to the magnetic field;
- a second measurement unit to measure second electric power in the frequency range two or more times, the second electric power being supplied to a load; and wherein the foreign-substance detector identifies a first peaking frequency and a third peaking frequency, and detects the foreign substance by the use of shift amounts of the first peaking frequency and the third peaking frequency, the first peaking frequency being a frequency at which the first reflectance reaches a local minimum, the third peaking frequency being a frequency at which a power transmission efficiency reaches a local maximum, the power transmission efficiency being determined by the first electric power and the second electric power.

7. The system according to claim 6, wherein
the power receiving apparatus further includes a load controller to control a resistance value of the load through which the second AC signal passes; and
the foreign-substance detector further uses the resistance value of the load controlled by the load controller to detect the foreign substance.

8. The system according to claim 6, wherein
the power receiving apparatus further includes a load controller to control the resistance value of the load to be constant during measurement periods of time for the first measurement unit and the second measurement unit.

9. The system according to claim 6, wherein
the foreign-substance detector judges that the foreign substance is present if the first peaking frequency is higher than the first resonance frequency.

10. The system according to claim 6, wherein
the foreign-substance detector judges that the foreign substance is present if the third peaking frequency is higher than the third resonance frequency.

11. The system according to claim 6, wherein
the foreign-substance detector further uses the number of local minimums of the first reflectance in the frequency range to detect the foreign substance.

12. A wireless power transmission apparatus using a power transmission coil to wirelessly transmit electric power to a power receiving apparatus having a power receiving coil, comprising:
- a voltage supply to be frequency-variable and capable of outputting a first AC signal;
- a power supply controller that varies a frequency of the first AC signal in a frequency range from a first frequency to a second frequency;
- the power transmission coil to resonate at a first resonance frequency and to generate a magnetic field by receiving the first AC signal;
- a first measurement unit to measure a first reflectance between the voltage supply and the power transmission coil in the frequency range two or more times, the first reflectance being at least one of a voltage reflectance of the first AC signal, an AC reflectance of the first AC signal, and a power reflectance of the first AC signal, wherein a foreign substance between the power transmission coil and the power receiving coil is detected by the use of a first peaking frequency at which the first reflectance reaches a local minimum.

13. The apparatus according to claim 12, further comprising:
a receiver to receive a piece of information of a second peaking frequency at which at least one of a voltage reflectance of a second AC signal, an AC reflectance of the second AC signal, and a power reflectance of the second AC signal reaches a local minimum, the second AC signal being generated by the magnetic field via the power receiving coil,
wherein the foreign substance is detected by the use of the first peaking frequency and the second peaking frequency.

14. The apparatus according to claim 13, wherein
the foreign substance is detected if the first peaking frequency is higher than the first resonance frequency.

15. The apparatus according to claim 13, wherein
the foreign substance is detected if the second peaking frequency is higher than the second resonance frequency.

16. The apparatus according to claim 12, wherein
the foreign substance is detected if the first peaking frequency is higher than the first resonance frequency.

17. The apparatus according to claim 12, further comprising:
a receiver to receive a piece of information of second electric power of a second AC signal generated by the magnetic power via the power receiving coil,
wherein
the first measurement unit measures first electric power in the frequency range two or more times, the first electric power being transmitted by the power transmission coil, and
the foreign substance is detected by the use of the first peaking frequency and a third peaking frequency at which a power transmission efficiency reaches a local minimum, the power transmission efficiency being determined by the first electric power and the second electric power.

18. The apparatus according to claim 17, wherein
the foreign substance is detected if the third peaking frequency is higher than the third resonance frequency.
19. The apparatus according to claim 17, wherein
the foreign substance is detected if the first peaking frequency is higher than the first resonance frequency.

* * * * *